United States Patent
Friedman et al.

(10) Patent No.: US 10,564,796 B2
(45) Date of Patent: Feb. 18, 2020

(54) HAPTIC INTERACTION

(71) Applicant: MasterCard International Incorporated, Purchase, NY (US)

(72) Inventors: Michael Jason Friedman, Stamford, CT (US); Derek Humphreys, Lucan (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/842,872

(22) Filed: Dec. 14, 2017

(65) Prior Publication Data

US 2019/0187859 A1    Jun. 20, 2019

(51) Int. Cl.
| | | |
|---|---|---|
| *G06F 17/00* | (2019.01) | |
| *G06F 3/0481* | (2013.01) | |
| *G06F 3/01* | (2006.01) | |
| *G06F 3/0488* | (2013.01) | |
| *G06Q 30/06* | (2012.01) | |

(Continued)

(52) U.S. Cl.
CPC ............ *G06F 3/0481* (2013.01); *G06F 3/014* (2013.01); *G06F 3/016* (2013.01); *G06F 3/039* (2013.01); *G06F 3/0488* (2013.01); *G06N 20/00* (2019.01); *G06Q 20/34* (2013.01); *G06Q 20/401* (2013.01); *G06Q 20/405* (2013.01);

(Continued)

(58) Field of Classification Search
CPC ........... G06F 2203/014; G06F 3/04812; G06F 3/03547
See application file for complete search history.

(56) References Cited

U.S. PATENT DOCUMENTS

| | | |
|---|---|---|
| 6,636,833 B1 | 10/2003 | Flitcroft et al. |
| 7,136,835 B1 | 11/2006 | Flitcroft et al. |

(Continued)

FOREIGN PATENT DOCUMENTS

| | | |
|---|---|---|
| WO | WO2007096648 A1 | 8/2007 |
| WO | WO2019118086 A1 | 6/2019 |
| WO | WO2019125621 A1 | 6/2019 |

OTHER PUBLICATIONS

VRgluv, LLC, VRgluv—Force Feedback Haptic Gloves for VR, pp. 1-5, downloaded Oct. 18, 2017, www.vrgluv.com.

(Continued)

*Primary Examiner* — Andrew T McIntosh
(74) *Attorney, Agent, or Firm* — Otterstedt, Wallace & Kammer, LLP

(57) ABSTRACT

A web site map of an external site, including information permitting determination of at least one pertinent location on the site, is obtained at a rules engine. At least one rule specifying peripheral behavior in a region adjacent the at least one pertinent location on the site is also obtained at the engine. Furthermore, an indication that a peripheral device corresponding to the at least one rule is being used to browse the site is also obtained at the engine. Instructions corresponding to the at least one rule specifying the peripheral behavior in the region adjacent the at least one pertinent location on the site are dispatched from the rules engine to the peripheral device. The instructions are configured to cause a stimulus to a user of the peripheral device prior to the user attempting to consummate an action on the web site.

25 Claims, 13 Drawing Sheets

(51) Int. Cl.
*G06Q 20/40* (2012.01)
*G06Q 20/34* (2012.01)
*G06N 20/00* (2019.01)
*G06F 3/039* (2013.01)
*H04L 29/06* (2006.01)

(52) U.S. Cl.
CPC ..... *G06Q 30/0641* (2013.01); *G06Q 2220/00* (2013.01); *H04L 63/1408* (2013.01)

(56) References Cited

U.S. PATENT DOCUMENTS

| | | | |
|---|---|---|---|
| 7,929,805 | B2 | 4/2011 | Wang et al. |
| 2002/0138562 | A1* | 9/2002 | Wies ............ G05B 19/00 709/203 |
| 2003/0098803 | A1 | 5/2003 | Gourgey et al. |
| 2006/0134586 | A1 | 6/2006 | Armingaud et al. |
| 2010/0058470 | A1* | 3/2010 | Kim ............ G06F 21/56 726/22 |
| 2010/0100480 | A1 | 4/2010 | Altman et al. |
| 2011/0155044 | A1 | 6/2011 | Burch et al. |
| 2011/0251952 | A1 | 10/2011 | Kelly et al. |
| 2011/0264491 | A1* | 10/2011 | Birnbaum ........ G06F 3/016 705/14.4 |
| 2012/0137403 | A1* | 6/2012 | Bone .......... G06F 3/03545 2/163 |
| 2012/0197788 | A1 | 8/2012 | Sanghvi et al. |
| 2013/0069772 | A1 | 3/2013 | Najafi et al. |
| 2013/0290177 | A1 | 10/2013 | Milam et al. |
| 2013/0311362 | A1 | 11/2013 | Milam et al. |
| 2015/0082401 | A1 | 3/2015 | Gupta et al. |
| 2016/0302065 | A1 | 10/2016 | Bansal |
| 2017/0090569 | A1* | 3/2017 | Levesque ........ G06F 3/016 |
| 2017/0094636 | A1 | 3/2017 | Fadell et al. |
| 2017/0153702 | A1* | 6/2017 | Abrahams ....... G06F 3/016 |
| 2017/0178272 | A1 | 6/2017 | Lashkari et al. |
| 2017/0316717 | A1* | 11/2017 | Aly ............ G09B 21/004 |
| 2019/0196588 | A1 | 6/2019 | Friedman et al. |

OTHER PUBLICATIONS

VRgluv, LLC, VRgluv—Force Feedback Gloves for Virtual Reality, pp. 1-10, downloaded Dec. 9, 2017, www.vrgluv.com.
Virtuix, Virtuix Omni first of its kind active virtual reality motion platform, pp. 1-3 downloaded Oct. 18, 2017 from www.virtuix.com/.
Tactai, Introducing Tactai Touch, downloaded Jul. 18, 2017 from http://tactai.com/, pp. 1-3.
Google, reCAPTCHA: Easy on Humans, Hard on Bots, downloaded Jul. 18, 2017 from https://www.google.com/recaptcha/intro/, pp. 1-7.
Mastercard International Incorporated, MasterCard in Contro™ is the perfect tool for you to stay protected, p. 1, Downloaded Aug. 18, 2017 From www.MASTERCARD.com.
Digital Trends, Manus VR gloves let you reach out and touch the future_Digital Trends, by Will Fulton—Posted on Mar. 24, 2016, downloaded Oct. 18, 2017 from https://www.digitaltrends.com/virtual-reality/manus-vr-gloves-hands-in/, pp. 1-5.
Manus VR, Manus VR_The Pinnacle of Virtual Reality Controllers_, pp. 1-4, downloaded Dec. 9, 2017 from manus-vr.com/.
Wikipedia, Haptic technology, downloaded May 24, 2017 from https://en.wikipedia.org/wiki/Haptic_technology, pp. 1-12.
Glider Gloves _#1 Rated Touch Screen Gloves on the Planet, pp. 1-7 downloaded Dec. 8, 2017 from https://www.glidergloves.com/.
Virtuix, E3 and Omni Cable_Virtuix Omni, pp. 1-7 downloaded Dec. 9, 2017 from www.virtuix.com/.
Manus VR, Product Information Datasheet, Development Kit—Version 1.1—April 2017, pp. 1-5, lownloaded Dec. 9, 2017 from www.manus-vr.com.
Michael Jason Friedman et al., Handshake to Establish Agreement Between Two Parties in Virtual Reality, unpublished U.S. Appl. No. 16/006,560 filed Jun. 12, 2018, pp. 1-64 plus 13 sheets drawings.
Catherine A. Todd et al., An Audio Haptic Tool for Visually Impaired Web Users, J. Emerging Trends in Computing Information Sciences, v. 3 No. 8, Aug. 2012 pp. 1136-1145.
Wikipedia, Microsoft HoloLens, pp. 1-9, Downloaded Mar. 27, 2018 https://en.wikipedia.org/wiki/Microsoft_HoloLens, page was last edited on Mar. 9, 2018.
Wikipedia, Kinect, Downlaoded Jan. 26, 2018 From https://en.wikipedia.org/wiki/Kinect, pp. 1-20, page was last edited on Jan. 12, 2018.
Wikipedia, Captcha, pp. 1-8 Downloaded Sep. 3, 2017 From https://en.wikipedia.org/wiki/Captcha.
Wikipedia, reCAPTCHA, pp. 1-6 Downloaded Sep. 3, 2017 From https://en.wikipedia.org/wiki/ReCAPTCHA.
Educational System Federal Credit Union, Online Banking Login Instructions, pp. 1-4, Downloaded Sep. 3, 2017 From www.esfcu.org.
Android Apps on Google Play, Pattern Lock Screen, Downloaded Sep. 3, 2017 From https://play.google.com/store/apps, pp. 1-3, Last Updated Mar. 9, 2017.
Peter Mell and Timothy Grance, The NIST Definition of Cloud Computing, NIST Special Publication 800-145, Sep. 2011, cover, pp. i-iii and 1-3.

* cited by examiner ically to the use of haptic technology in the electronic and computer arts, and, more particularly, but not exclusively, to use of haptic technology and/or related stimuli in electronic commerce and the like.

HAPTIC INTERACTION

FIELD OF THE INVENTION

The present invention relates generally to the use of haptic technology in the electronic and computer arts, and, more particularly, but not exclusively, to use of haptic technology and/or related stimuli in electronic commerce and the like.

BACKGROUND OF THE INVENTION

Haptic communication recreates the sense of touch by applying forces, vibrations, and/or motions to a user. Uses include assistance in the creation of virtual objects in a computer simulation, control of such virtual objects, and enhancement of the remote control of machines and devices. Haptic devices may incorporate tactile sensors that measure forces exerted by the user on the interface.

In virtual reality systems, haptics add the sense of touch to previous visual-only interfaces. Haptics may be useful for those who are visually impaired, but can also provide an enhanced user experience for those having unimpaired vision.

SUMMARY OF THE INVENTION

Principles of the present invention provide techniques for haptic interaction with a consumer to incentivize and/or restrict a purchase transaction. In one aspect, an exemplary method, according to an aspect of the invention, includes obtaining, at a rules engine, a web site map of an external web site. The web site map includes information permitting determination of at least one pertinent location on the web site. Further steps include obtaining, at the rules engine, at least one rule specifying peripheral behavior in a region adjacent the at least one pertinent location on the web site; obtaining, at the rules engine, an indication that a peripheral device corresponding to the at least one rule is being used to browse the web site; and dispatching, from the rules engine to the peripheral device, instructions corresponding to the at least one rule specifying the peripheral behavior in the region adjacent the at least one pertinent location on the web site. The instructions are configured to cause a stimulus to a user of the peripheral device prior to the user attempting to consummate an action on the web site.

In another aspect, another exemplary method, according to another aspect of the invention, includes obtaining, at a rules engine, at least one rule specifying peripheral behavior when browsing a web site for which a site map is not available to the rules engine; obtaining, at the rules engine, an indication that a peripheral device corresponding to the at least one rule is being used to browse the web site; and dispatching, from the rules engine to the peripheral device, instructions corresponding to the at least one rule specifying the peripheral behavior when browsing the web site. The instructions are configured to cause a stimulus to a user of the peripheral device prior to the user attempting to consummate an action on the web site.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as:
  increasing accessibility to web sites and the like for the visually impaired;
  enhancing security in electronic commerce and/or web browsing;
  warning and/or assisting the visually impaired; and/or
  allowing haptic feedback on a web site with minimal effort on the part of the site developer (e.g., using a standardized web markup technique without the requirement for a specialized browser plugin—note that some embodiments make use of browser plug-ins for anti-virus and/or malware detection).

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
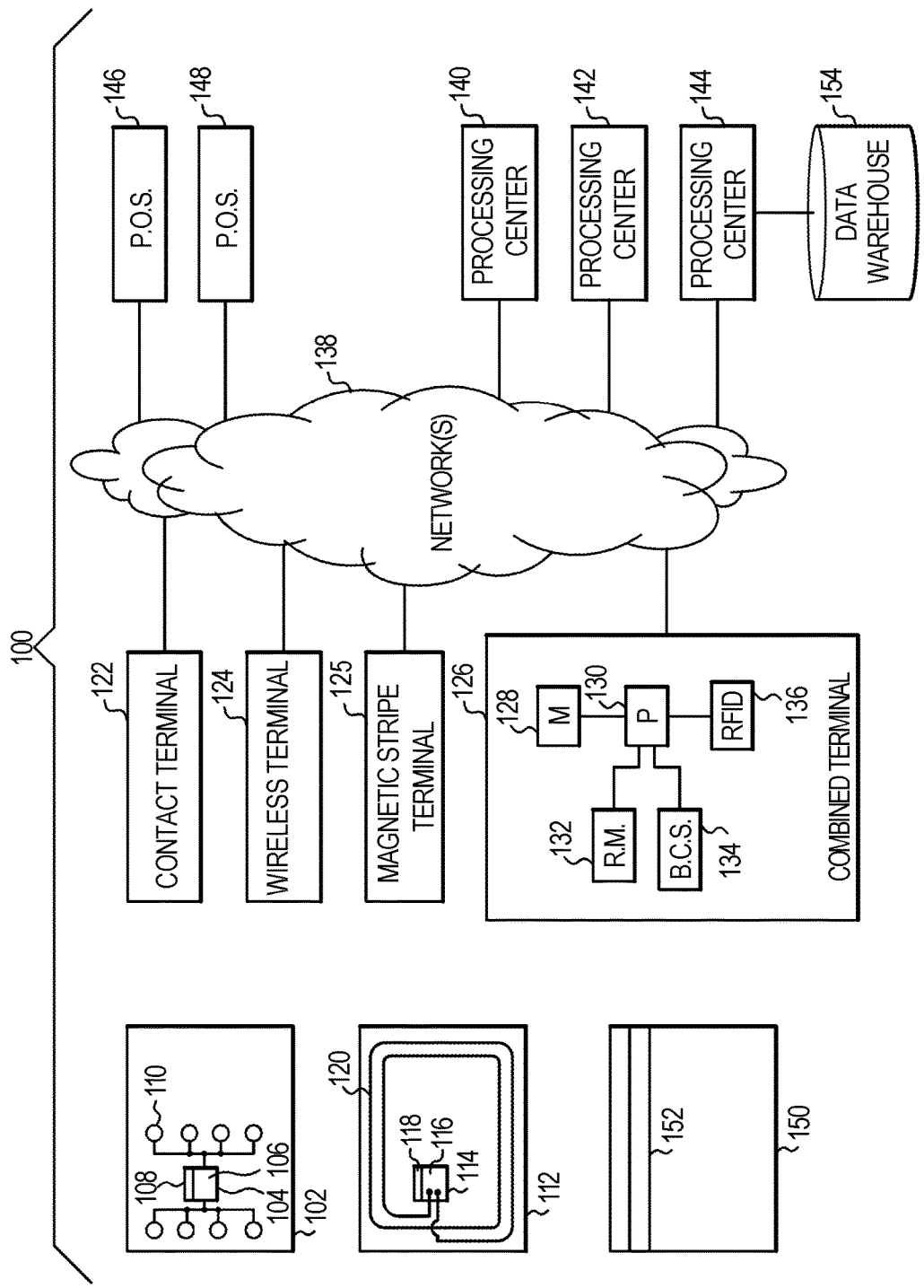
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Mastercard® Contactless specifications (the skilled artisan will appreciate that MASTERCARD CONTACTLESS was formerly known as MASTERCARD PAYPASS), available under license from Mastercard International Incorporated of Purchase, N.Y., USA (marks of Mastercard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction. It should be noted that one or more embodiments are applicable to both token-based transactions (see, e.g., "EMV® Payment Tokenisation Specification: Technical Framework," Version 1.0, March 2014, EMVCo, LLC ("EMVCo"), expressly incorporated herein by reference in its entirety for all purposes) and PAN-based transactions.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
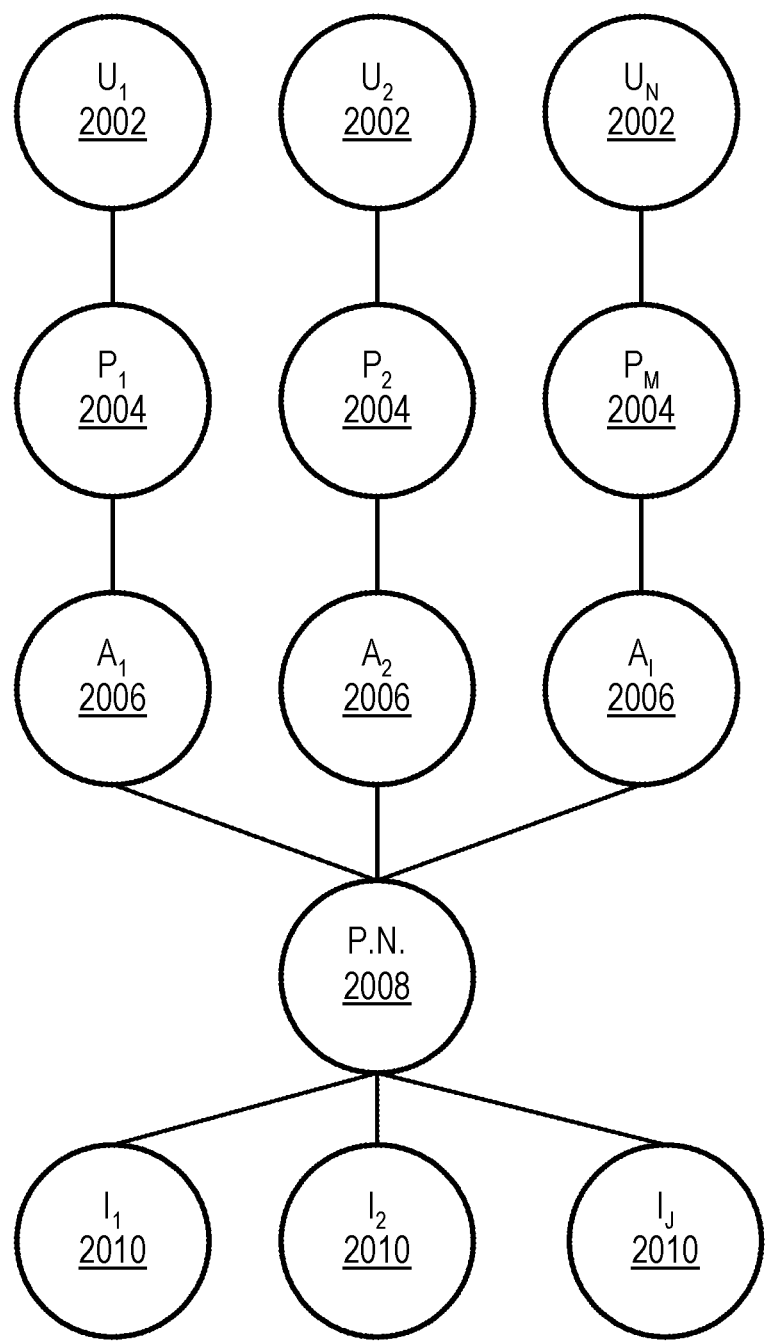
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_L$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, Mastercard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
  ISO 8583 Part 2: Application and registration procedures for Institution Identification Codes (IIC) (1998)
  ISO 8583 Part 3: Maintenance procedures for messages, data elements and code values (2003)
  ISO 8583:1993 (1993)
  ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN)(which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of Mastercard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

Figure 4:
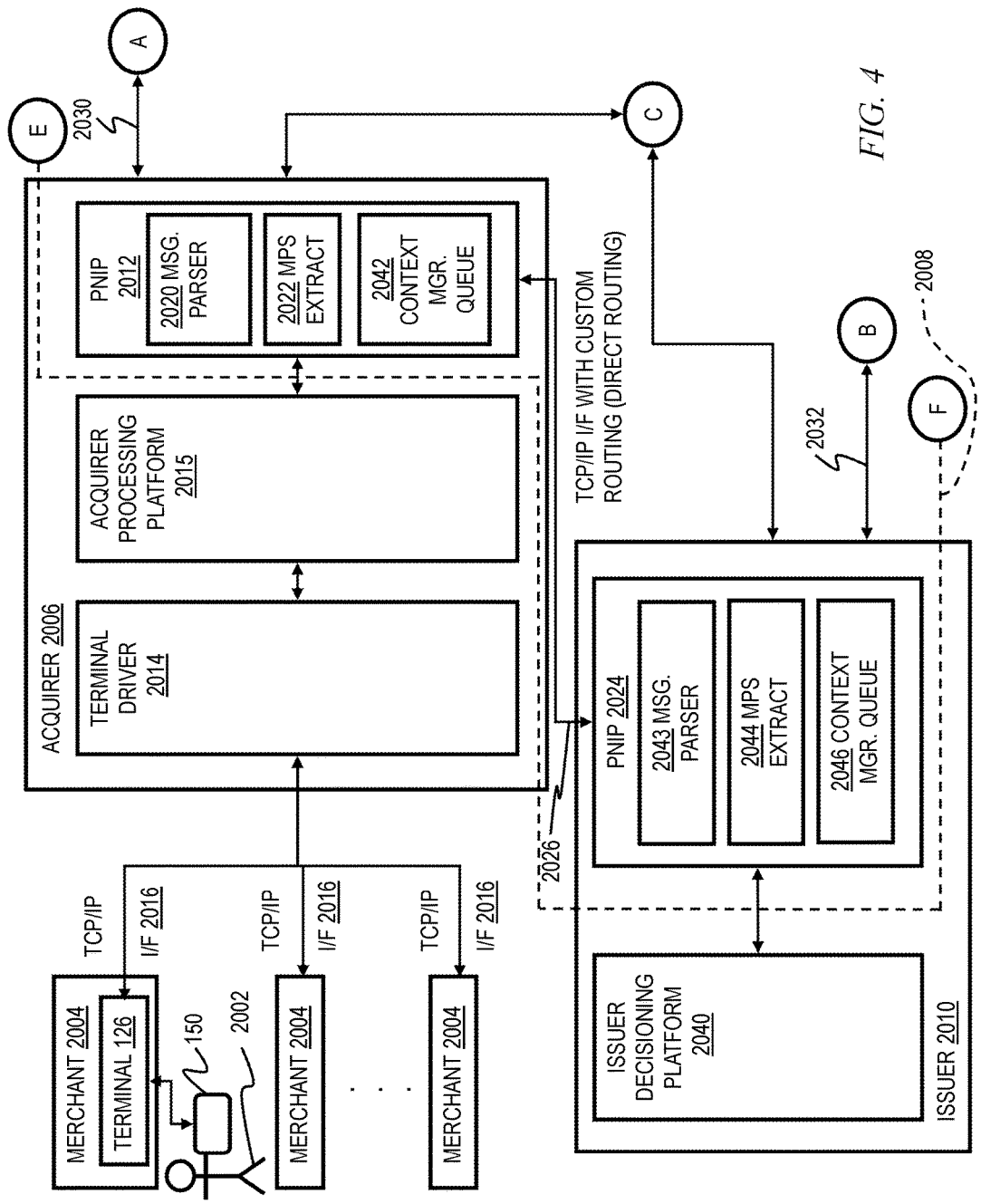
FIGS. 4 and 5 provide an exemplary detailed view of operation of a payment card network, in accordance with an aspect of the disclosure.
Figure 5:
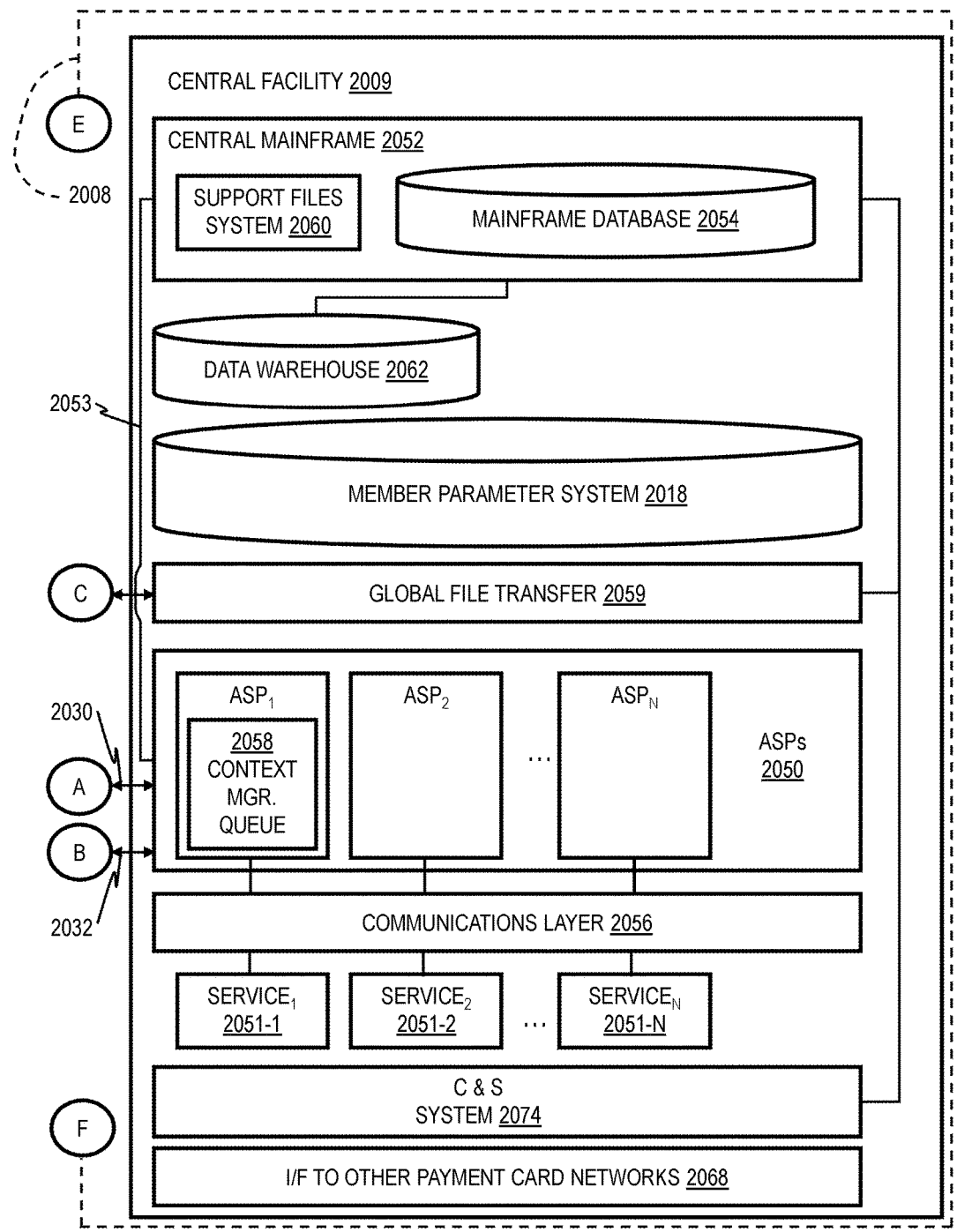

Still referring to FIG. 2, and with reference also now to FIGS. 4 and 5, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (for example, by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 4 and 5 encompasses the network 2008. Note generally that points A, B, C, E, and F in FIG. 4 connect to the corresponding points in FIG. 5; the entire network and associated environment are not amenable to illustration on a single sheet.

More specifically, the acquirer 2006, in the more specific example of FIGS. 4 and 5, has at its premises a payment network interface processor (PNIP 2012). The Mastercard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by Mastercard for use by a member to uniquely identify activity the member is responsible for. A BIN or Bank Identification Number is a unique series of numbers assigned by Mastercard to a principal member and used as the first six digits of a cardholder account number. Other payment card networks have similar types of numbers, as will be apparent to the skilled artisan.

Figure 7:
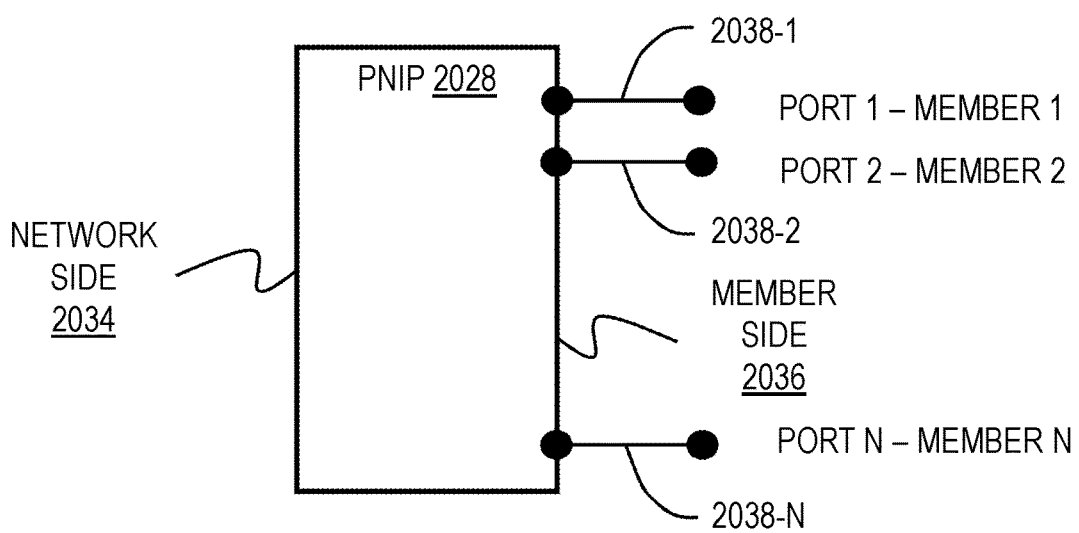
FIG. 7 shows a port arrangement on a payment network interface processor, such as may be used with the network of FIGS. 4 and 5.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 7 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 6:
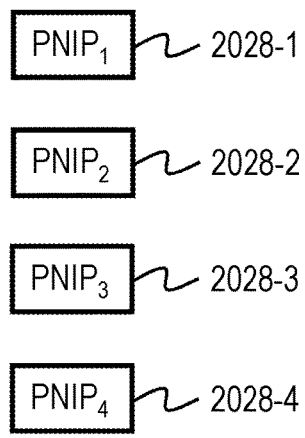
FIG. 6 shows a group of payment network interface processors, such as may be used with the network of FIGS. 4 and 5.
Figure 9:
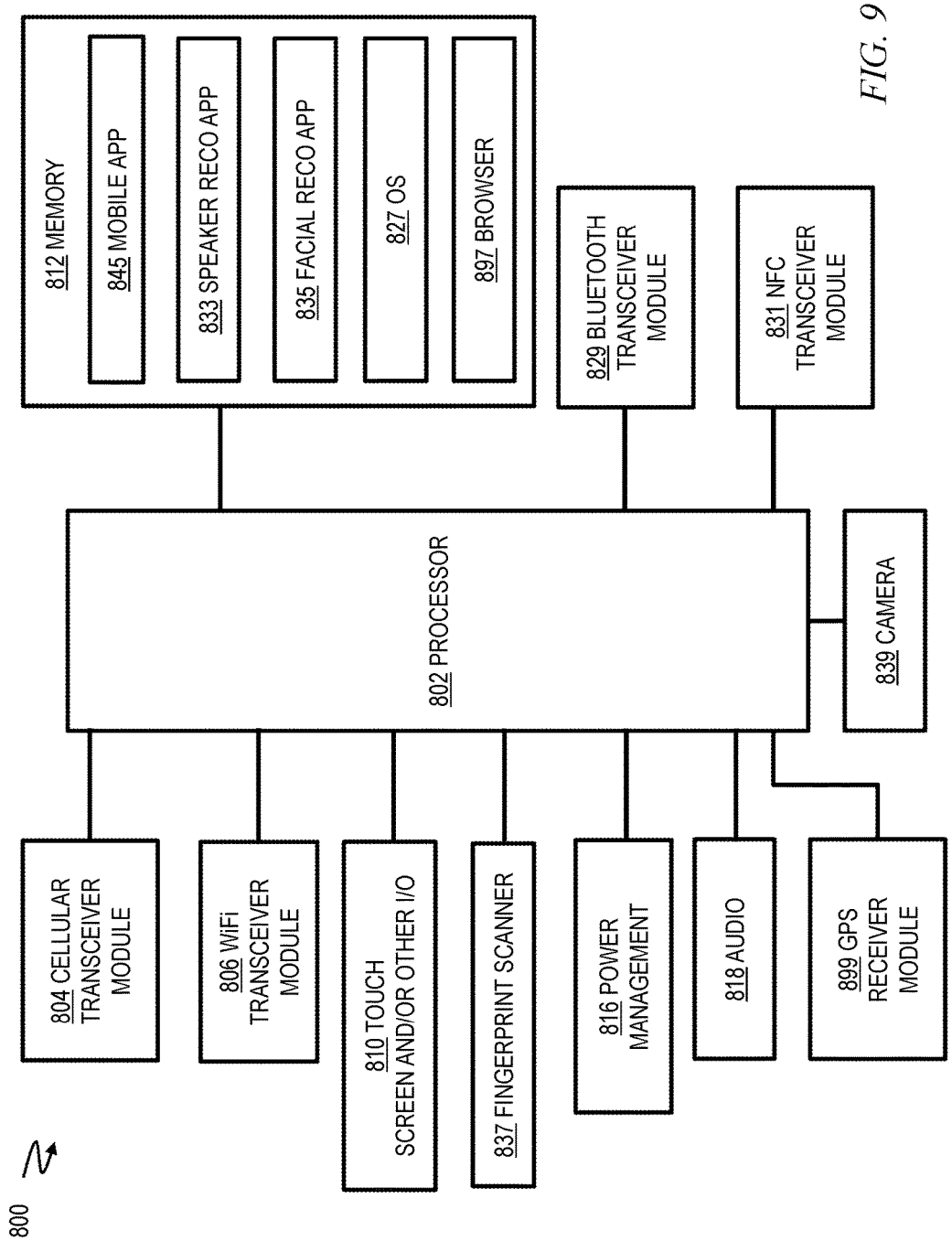
FIG. 9 is a block diagram of a "smart" phone or tablet computer useful in one or more embodiments of the invention.

FIG. 6 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 6 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 7 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 8:
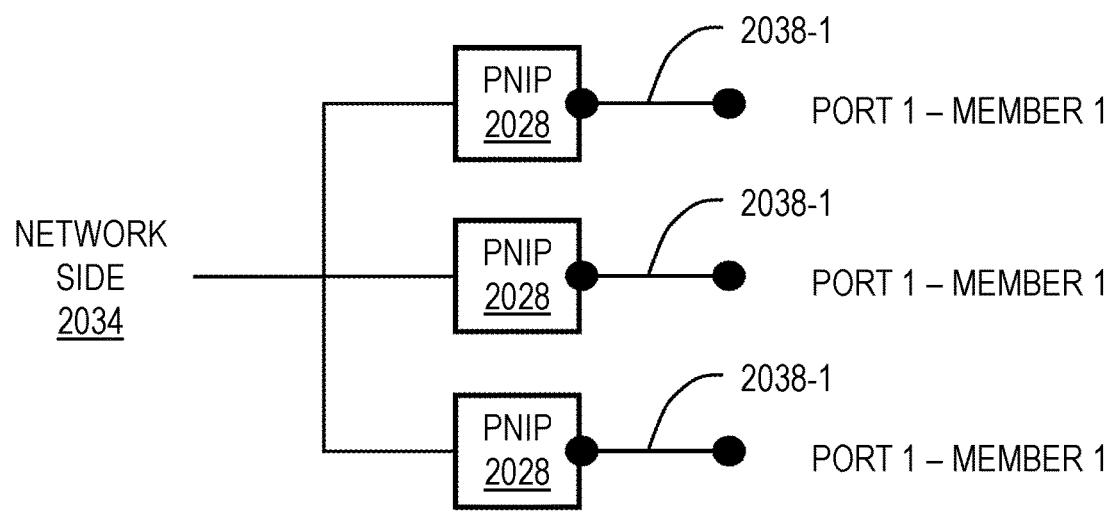
FIG. 8 shows a case wherein an issuer has multiple payment network interface processors.

As seen in FIG. 8, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 7). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 4 and 5 show "MPS extract" 2022, 2044; this will typically include the extract itself and the associated parameter file manager which manages obtaining the extracts from MPS 2018. Similarly, to reduce clutter, FIGS. 4 and 5 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 4 and 5 to avoid clutter.

Messages in case of Enhanced Services: In one or more instances, a special architecture is used to facilitate delivery of enhanced services (the ASP 2050 in FIGS. 4 and 5 is a non-limiting example). Examples of enhanced services include the Mastercard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transaction is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

While payment card networks have generally been used as described with regard to FIGS. 1 and 2, recently, Mastercard MONEYSEND (mark of Mastercard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a Mastercard card account or other branded card account that the Originating Institution accepts; from a bank account; or with cash. A Payment Transaction transfers funds from the Originating Institution, via the Mastercard Network (e.g., BANKNET), to the payment card account identified by the recipient at the Receiving Institution. Funds can be transferred to a Mastercard® card, Debit Mastercard® card, and the like (marks of Mastercard International Incorporated, Purchase, N.Y., US). Such transactions are a non-limiting example of what can be more generally referred to as special payment transactions.

Exemplary Mobile Device

FIG. 9 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some cases, fingerprint scanner 837 is coupled to processor 802 for biometric authentication purposes. An appropriate corresponding software application (not separately depicted) may reside in memory 812 in some instances. A digital camera 839 is coupled to processor 802. Camera 839 can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 9 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

Application (mobile app) 845 in memory 812 can represent a variety of applications such as a mobile banking application as discussed below.

Every instance need not necessarily have every feature depicted in FIG. 9.

Haptic Interaction and Related Aspects

Figure 10:
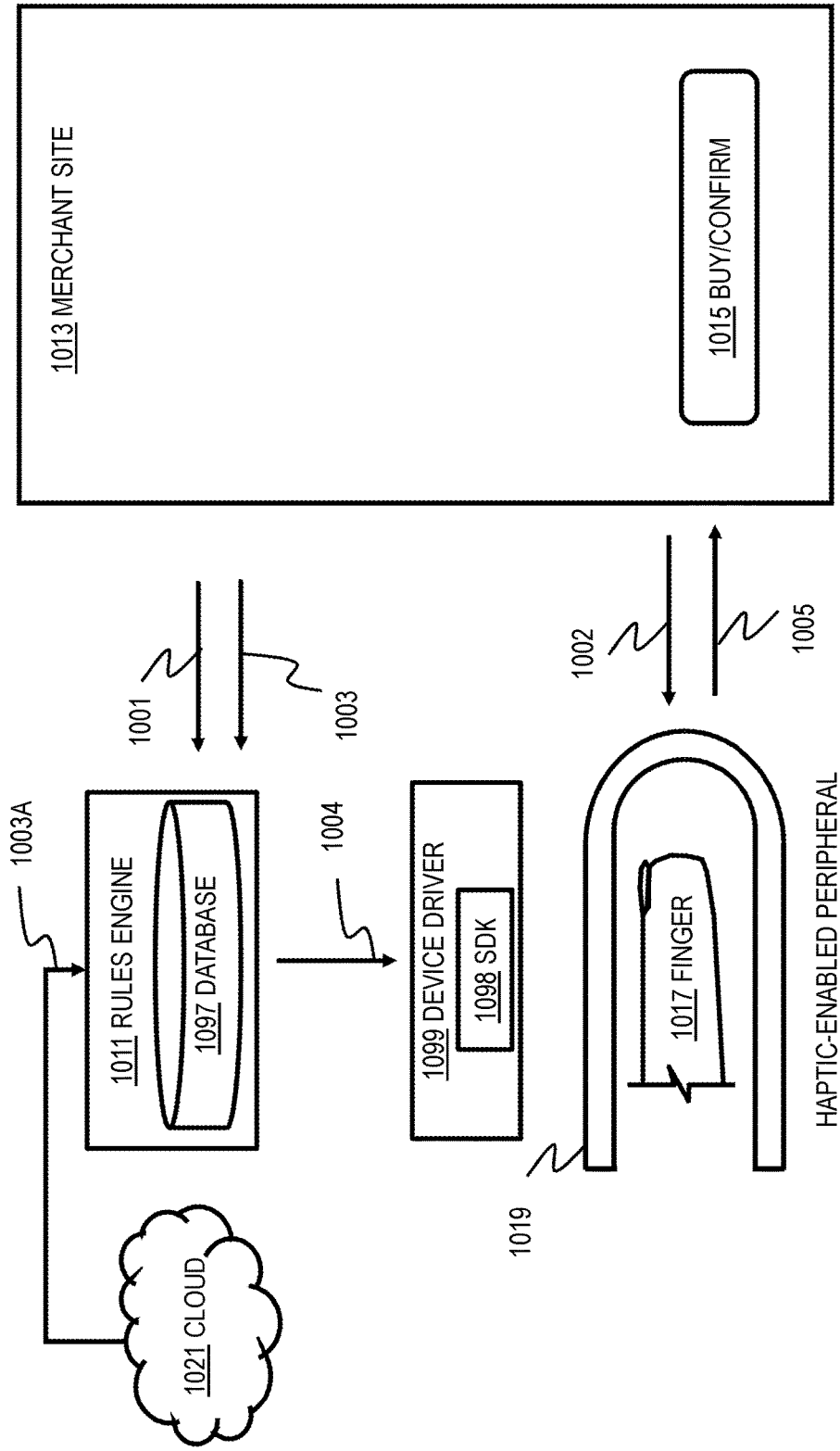
FIG. 10 is a combined block diagram and data flow diagram depicting a first embodiment of a system and method, according to an aspect of the invention.

Referring to FIG. 10, in a first step of a first embodiment, the merchant has a location 1015 on its web site 1013 that it wants users to engage with; e.g., a "buy" or "signup" button or the like represented by the "Buy/Confirm" button 1015. In order to make the location of that button known, a site map is submitted to the rules engine 1011 as illustrated by arrow 1001, or some other method of identifying the location to the rules engine is employed. The rules engine 1011 is then provided with one or more rules setting forth what should happen when a peripheral (e.g., the haptic-enabled peripheral 1019) encounters this area of the screen (i.e. proximity of button 1015). The rules specify that the peripheral should behave in a certain way. The rule(s) can be specified to the rules engine by, for example, the merchant, the consumer, the consumer's bank, and/or another appropriate individual or entity.

In a second step illustrated by arrow 1002, the peripheral such as 1019 senses the merchant's site 1013; for example, the individual whose finger 1017 is shown interacting with the peripheral 1019 is on a web page (merchant site 1013). For example, the user is using his or her finger to guide a cursor around a screen. Data returned includes the coordinates of the cursor's location on the screen. When the page first loads, it will send the URL to the rules engine 1011. At least a portion of the page will be loaded into the rules engine; the engine will ignore the page's content and focus on the special tags used to mark the page up. In some instances, the engine creates a map of what is on the page. Based on the coordinates of where the person is at any point in time, the engine will be able to provide feedback to the glove or other peripheral indicating, for example, that, based on the cursor being located at X=tic 200, Y=tic 2; the desired button 1015 is below the current location. The feedback provided to the glove or other peripheral indicates that the cursor should be moved in the desired direction towards the button 1015.

In one or more embodiments, on page load, the rules engine 1011 receives the URL for the site 1013; interprets the markup to prepare/obtain a map of the page; keeps track of the coordinates of where the person is on the page; and then provides feedback to the peripheral to guide the user to the next desired location. Thus, in step 1001 load, the URL of site 1013 into the rules engine 1011 and carry out one-time mapping (or load pre-existing map). Step 1003 represents the provision of feedback regarding how the user is moving on the page. As the user navigates the screen, the rules engine keeps track that the user is at different locations. When the user initially wears the haptic-enabled peripheral, he or she can initially move the cursor to a predetermined location such as the top left-hand corner or bottom right-hand corner of the screen. Once the peripheral gets its bearings, it keeps track of motions from that point onward, so it knows the user has moved down, up, etc.

By way of clarification, while the peripheral 1019 will move, in one or more embodiments the page casts back the location of the cursor. The rules engine does not necessarily need to know where/how the peripheral is moving per se; it needs to know, rather, where the cursor is moving on the screen based on the glove/peripheral action. For example, if the user drops the glove or other peripheral 1019 down to his or her side, the mouse cursor may move to the bottom of the screen and stop there. When the user moves his or her hand back up again, the mouse cursor moves back up. Thus, step 1001 represents when the merchant site 1013 first loads on the user's device; data flow 1003 is from the merchant site to the rules engine, to update cursor location.

It will be appreciated that step 1001 can include loading and/or building a site map. In some instances, a site map can be prepared during a registration phase, before the person navigates to the site. In other instances, the map is prepared by engine 1011 the first time the page loads. The rules engine may keep a database 1097 of maps based on pre-registration and/or prior construction. When the page is loaded, one of the tags may call out to the rules engine to load the map of the page in question. Thus, in one or more embodiments, 1001 is called at page load. In some instances, there is a pre-registration phase during which the rules engine talks directly to the merchant without the consumer's computer. Then, when the consumer navigates to the site, the consumer's computer sends the URL to the rules engine, which determines that it has prior knowledge of that URL. The peripheral then sends its coordinates to the rules engine. Again, when the page loads, its URL is sent to the rules engine, which can either build a map there "on the spot" or can access a map previously cached from a registration (or previous construction). In at least some cases, the peripheral does not directly communicate with the rules engine—communication is one-way as shown at 1004 with the engine directing the peripheral where to guide the user.

Data flow 1003 thus shows the merchant site (actually its rendering in the browser of the use's computer) updating the rules engine with the current position of the user's cursor. Furthermore in this regard, the user's computer communicates with the web site, and the web site is rendered on the user's computer by the user's web browser. Thus, it is essentially the user's browser on the user's computer that is aware of what the cursor's coordinates are. It is not necessarily required to go back to the merchant's server to talk to the rules engine; interaction can be directly from the user's browser to the rules engine. In effect, the browser is making a call to a remote rules engine. The browser sends the user's cursor location to the rules engine, which sends feedback to the peripheral telling the peripheral to urge the user to the desired screen location.

Thus, by way of review, data flow 1001 represents the following:
1. initial registration of merchant 1013 with entity providing rules engine 1011, without involving user, to create site map, followed by retrieval of site map by rules engine 1011 when user loads page into his or her browser; OR
2. rules engine 1011 creates site map when user first loads page into his or her browser (merchant is cooperating however by embedding appropriate codes in the site html).

Some embodiments could use a mixture of (1) and (2) above; for example, some web sites could pre-register and for others, the site map could be developed on the fly when the page first loads.

Furthermore, data flow 1003 represents the subsequent interaction between the web site rendered in the user's browser, and the rules engine; including where the user is on the screen corresponding to the web site; the rules engine knows how to guide the user via the peripheral, as seen at 1004.

Note that some X Box controllers and gaming mice have the ability to vibrate. However, they may not have the fine guidance capability of a haptic glove or the like. In some embodiments, peripheral 1019 provides a sensation of pressure above, below, left, or right to actually guide the user's hand. Any appropriate kind of haptic feedback can be employed in one or more embodiments.

Peripheral 1019 has a device driver 1099. The peripheral will be connected to the user's machine by, for example, a USB cable, Wi-Fi, Bluetooth, or the like. The machine will "think" that it is talking to a mouse. Essentially, the user's hand movements will be reflected by movement of the cursor. For all intents and purposes, the machine merely "thinks" that it is connected to some kind of pointer device; it just so happens that in one or more embodiments, the pointer is a haptic device; e.g., haptic-enabled glove, pen, tablet, mouse, etc. The device driver 1099 has a channel built in for communication with the rules engine 1011. When a rules-enabled web site loads up into the browser of the user's computer, the rules engine "knows" that it needs to communicate with the device driver 1099 of peripheral 1019.

More broadly, both "push" and "pull" models can be employed. In a "push" model, the rules engine 1011 communicates with the device driver 1099 on the user's machine to provide the needed feedback. In a "pull" or "polling" model, the peripheral polls the rules engine via the peripheral's device driver and can be told that "there are no rules for this page" or alternatively "yes, there are rules for this page." The peripheral can constantly poll and every time it asks the rules engine "what do I do next," the rules engine looks at its map, sees where the pointer is located, and sends back the appropriate feedback.

In one or more embodiments, when a new page loads, the first thing it does is to go to the rules engine and see if there are any rules for that page. If yes, feedback is provided and it continues polling. If no, stop polling until a new page loads. The level/frequency of polling can be user-configurable in one or more embodiments, via configuration of the device driver.

One or more embodiments include a database 1097 in the rules engine; this database or some other kind of data structure determines whether there are rules for a given URL. As noted, in the "poll" approach, the peripheral carries out a poll via the device driver. The rules engine 1011 then performs a simple query on its own database 1097 to see if it has an entry for the web site in question. If there is an entry, then the logical flow proceeds to determining what feedback to send to the device driver based on the current cursor position. Database 1097 or another suitable data structure includes the information: (a) are rules available for a given URL; and (b), if so, what are the rules for the different cursor locations. The rules engine 1011 can reside in the cloud and be managed by an entity such as Mastercard International Incorporated or other operator of a payment network or similar entity, or could be a software development kit (SDK) dropped into the device driver, which actually sits on the person's machine.

In this latter aspect, the user's machine is equipped with a haptic glove or other haptic peripheral 1019 and a special device driver is installed, which helps the peripheral communicate with the user's computer. In some embodiments, part of what is installed is a rules-based haptic feedback SDK 1098. Thus, the rules engine 1011 can be hosted on the person's device and it can access a database 1097 to find out what to do next, or the rules engine may exist in the cloud, but it will still talk to a database 1097 to find out what to do next. It is recognized that the peripheral 1019 is pointing to an area that is specified on the site, which is meant to cause the peripheral to interact in a certain way.

In the step illustrated by arrow 1003A, additional data is brought into the engine 1011; e.g., from cloud 1021. In a non-limiting example, this additional data could include, for example, the consumer's bank indicating that the consumer should not purchase anything over $1000 because the consumer's monthly budget would be exceeded. In the step illustrated by arrow 1004, the appropriate instructions are sent to the peripheral 1019 from the rules engine, based on the appropriate rules, in order to cause feedback (e.g. haptic feedback) by the peripheral to guide the user, as directed by the site and/or the rules engine.

Regarding cloud 1021 (and cloud 1121 mentioned below), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction, as the skilled artisan will appreciate from, for example, Peter Mell and Timothy Grance, NIST Special Publication 800-145, The NIST Definition of Cloud Computing, September 2011, expressly incorporated herein by reference in its entirety for all purposes.

"Site haptics" refers to site-directed physical feedback; the rules or instructions specifying what the peripheral should do in certain locations on the screen, possibly also conditioned on other data. For example, in this region of the screen, do nothing; in this region of the screen (say adjacent button 1015) provide a stimulus to attract or repel the user, as the case may be. The latter behavior might be conditioned on the aforementioned other data; i.e., if adjacent button 1015 but consumer has not exceeded monthly budget do nothing or guide the user to button 1015; if adjacent button 1015 and consumer has exceeded monthly budget, repel user from button 1015. Thus, appropriate feedback can be sent to the consumer thorough the peripheral 1019, thereby guiding the consumer towards or away from button 1015, as indicated by arrow 1005.

So, for example, if the rules engine 1011 indicates that the budget is exceeded, the site haptics sent in step 1004 indicate to the haptic-enabled peripheral 1019 that it should repel the user from the vicinity of button 1015. Alternatively, under different appropriate circumstances, the system can provide a stimulus to guide the consumer to push the button. The user guidance is illustrated by arrow 1005. Guidance may be appropriate, for example, for the visually impaired, for minor children, and the like. In the latter case, a child could be encouraged to buy a healthy snack or read a book rather than buying candy or playing a video game. Thus, non-limiting examples of things to which the consumer could be guided include offers, items of interest, contextually relevant items, and the like.

Examples of suitable virtual reality gloves include the Manus VR Glove, which is a high-end data glove that brings intuitive interaction to virtual reality, and is available from Manus VR, Eindhoven, Netherlands; and the "VRgluv" virtual reality glove available from VRgluv, LLC, Atlanta, Ga., USA. The non-limiting example in FIG. 10 shows a haptic-enabled peripheral enclosing a user's finger and functioning as a pointer. This represents, for example, an active portion of a virtual reality glove or the like. Other embodiments can use different approaches. Game controllers such as X Box and Play Station controllers may provide suitable haptic feedback in some instances. Wearable device such as an Apple Watch can provide a haptic "jolt."

Figure 12:
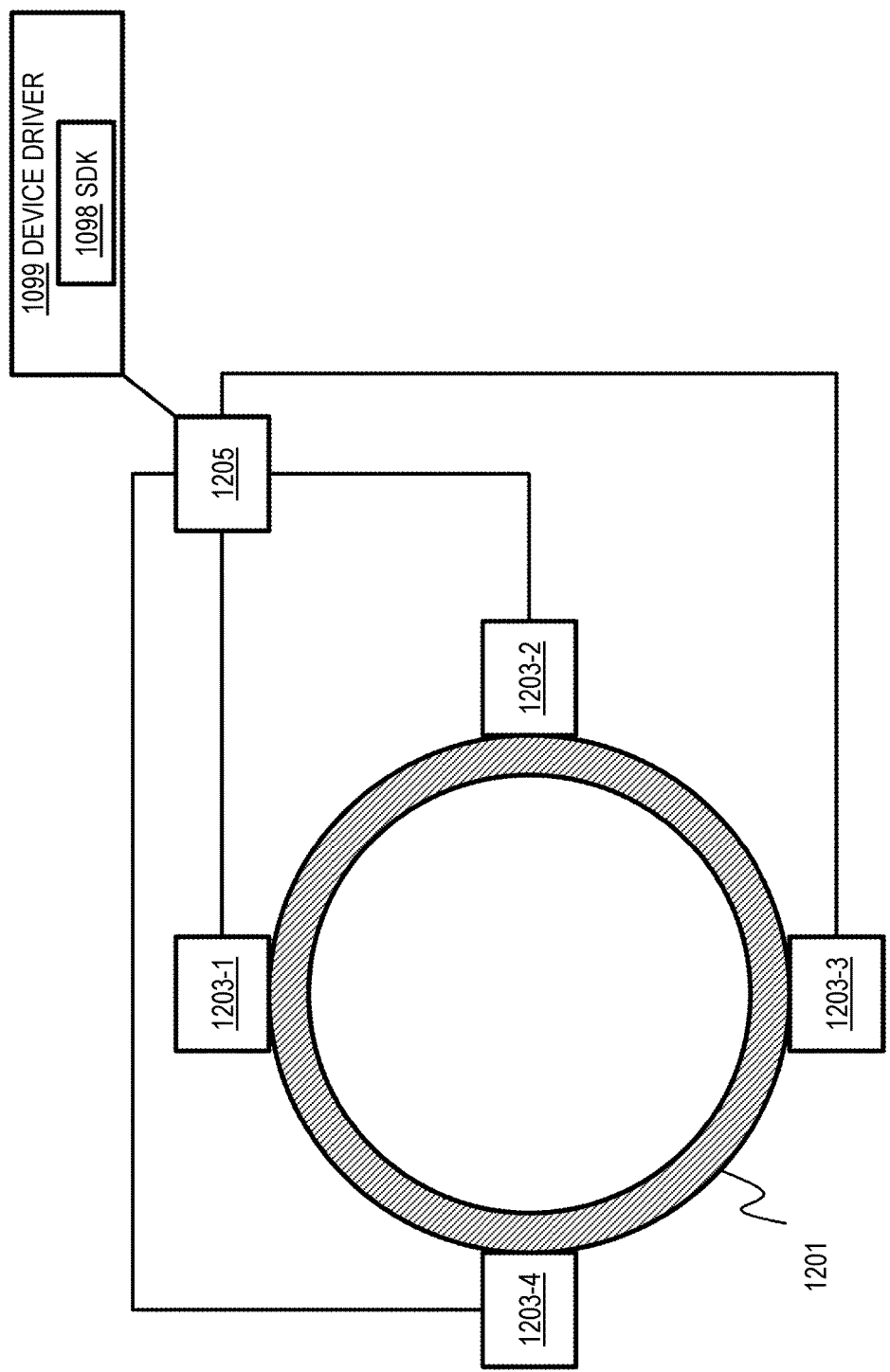
FIG. 12 shows an exemplary haptic peripheral device, according to an aspect of the invention.

FIG. 12 shows a cross-section of a single-finger peripheral 1201 (also representative of one finger of a multi-finger peripheral) suitable for one or more embodiments. Four actuators 1203-1, 1203-2, 1203-3, and 1203-4 (e.g., piezoelectric actuators, linear resonant actuators (LRAs), inflatable bladders, or the like) are located at 0, 90, 180, and 270 degrees respectively on single-finger peripheral 1201 (e.g., embedded in a rubber or polymer finger). Controller 1205 receives commands from a device driver and translates same into electrical or fluid signals to cause the appropriate actuator to vibrate or inflate. If desired to urge the user down, have an unpleasant vibration or pressure on top actuator 1203-1 (and vice-versa 1203-3 urges up); if desired to urge the user right, have unpleasant vibration or pressure on left actuator 1203-4 (and vice-versa 1203-2 urges left).

Other approaches can be used in different embodiments. For example, in some embodiments, the consumer may wear a full haptic glove; may interact with a screen or with augmented reality using a virtual (VR) or augmented reality (AR) headset, goggles, glasses, projection screen, or the like. Embodiments are thus not necessarily limited to desktop- or laptop-only experiences. The use of hand(s) and glove(s) with haptic feedback is a non-limiting example of sending a signal to the user encouraging the user to buy, drawing the user's attention to an action button, or alternatively, warning the user not to press the button because the user cannot afford the purchase, or for some other appropriate reason.

In an alternative embodiment, a smart phone (e.g. 800) and mobile banking app (e.g., particular instance of a mobile app 845) are employed. The smart phone vibrates and/or sends a ring tone to warn the user not to buy something; for example, a rules-based warning is provided that warns the user that the potential purchase is over budget, or is provided to warn a parent that his or her child is trying to buy something. Thus, embodiments are not limited to haptic feedback, and the notification from the rules engine 1011 could be delivered in an alternative manner such as a ring tone or vibration on smart phone. Broadly, another device could be used to give feedback, not necessarily haptic feedback. For example, a smart phone could be placed on a stand next to, or clipped onto the side of, an individual's monitor, and the phone's screen could be controlled to change to very strong contrasting colors. Suppose a visually impaired person is looking at the main computer screen and has difficulty understanding it. Suppose it is desired to guide the visually impaired person down and to the right. A contrasting "blob" appears on the middle of the smart phone's screen and moves down to the bottom right-hand bottom corner. It keeps doing this until the visually impaired user moves the cursor to the appropriate spot, after which the "blob" moves back to the middle of the smart phone's screen. Audio guidance could also be used; for example, as the user moves the cursor towards the correct spots, beeps become louder and/or faster. Thus, some embodiments use feedback other than haptic feedback.

However, haptic embodiment(s) are advantageous, for example, for the visually impaired, and even for those with full visual abilities. In some instances, even before giving the user a budgetary or other warning, it is desirable to draw the user's attention to the fact that there is an action button or the like (e.g. 1015) on the screen. Embodiments can also be used to call attention to a "special offer" or "members only" button.

Thus, embodiments that do employ haptic feedback via a haptically-enabled peripheral are not limited to fingertip action; other peripherals such as gloves and the like can be employed. Peripherals can be attached to computers, portable electronic devices, mobile phones, or the like, and in an appropriate manner provide the user tactile or other haptic feedback.

One or more haptically-enabled embodiments go beyond the provision of an alert to provide tactile sensations to pull or push a user away from/towards a button such as 1015 or the like. In another aspect, tactile feedback can be employed with a smart phone (e.g. 800) or other device by providing a sense of pressure or vibration on the user's hand as he or she navigates around a screen (e.g. touch screen) or augmented reality (AR) environment or virtual reality (VR) environment. In this aspect, the user wears a haptic glove with an open fingertip or with a special fingertip that works with the touch screen. For example, one or more fingertips of the haptic glove, or even the entire glove, can be made from a special conductive micro-fiber woven into a glove liner, to bridge the conductive gap your gloves create between the user and his or her device. The user's location on the screen is sensed based on his or her fingertip, in the usual manner, and conveyed to the device driver and rules engine for control of the haptic glove.

Hot or cold sensations or tingling sensations are other examples of ways to signal to a user. The tingling may be provided for both "hot" and "cold" but the user may be looking at a picture of a flame or an ice cube and may perceive "hot" or "cold" based on the tingling and visual cue. In another aspect, the haptic feedback may be generated at a sufficient intensity to create friction and thus heat.

It is worth noting that Mastercard International Incorporated currently has a service referred to as Mastercard In Control, which provides real-time email and mobile app alerts to inform the cardholder of where and how his or her Mastercard credit cards are being used. Such alerts give the cardholder immediate spending insights and help safeguard the cardholder against fraudulent activity. The cardholder can be notified, for example, when purchases exceed a certain amount; when Internet purchases are made; or when a card is being used outside of the United States or other jurisdiction of interest.

While a highly useful technology, the In Control service generally provides an alert after a purchase has already been made, or may simply decline a purchase if an attempt is made to carry out a purchase over a certain amount. That is to say, in using the In Control service, the user might actually select a button such as a buy/confirm button, causing the merchant to dispatch, via its acquirer, into an ISO 8583 payment card network, an ISO 8583 0100 authorization request. This request would be intercepted by the In Control service, which would cause an ISO 8583 0110 authorization request response to be returned with a "decline" (even if the cardholder had sufficient open-to-buy balance). In contrast, one or more embodiments of the invention warn the user before the purchase is attempted, i.e., before any ISO 8583 0100 or similar message is even sent. For example, when navigating to an order confirmation area, the peripheral used for the navigation reaches out to the rules engine, and feedback is provided before the order is placed.

Figure 13:
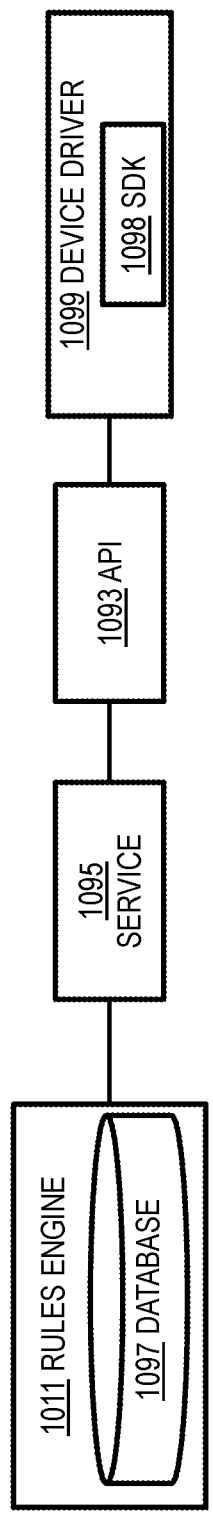
FIG. 13 shows provision of a rules engine as a service, according to an aspect of the invention.

Still referring to FIG. 10, merchant site 1013 can be located on the merchant's server or on the server of a hosting service; the URL for the site is loaded into the user's browser. The rules engine 1011 could be hosted by an entity such as Mastercard International Incorporated. In some instances, such an entity could offer the rules engine as a service like IN CONTROL technology to apply card controls (or Spend Controls and Spend Alerts platform). In this aspect, referring now also to FIG. 13, the rules engine 1011 could be hidden behind a rules service 1095 (e.g. web service) which is in turn hidden behind an API 1093. An SDK 1098 could be embedded inside the haptic device's device driver 1099. This SDK, in this aspect, is a thin layer that talks back to the API 1093 to interrogate the database 1097 behind the service 1095 and come back with an appropriate response. One or more embodiments can be implemented as a traditional API-delivered service, similar to In CONTROL, installments, etc. See discussion of 2050, 2051, 2056 above but note that one or more embodiments operate before an authorization request is sent into the payment network.

In some cases, an issuer or a merchant or the like could register the web site 1013 and the device (peripheral) manufacturers could register the devices; the rules and locations could be set up; and the entity receiving the registrations (e.g. an entity such as Mastercard International Incorporated) provides the rules engine as a service. A peripheral developer could be encouraged to register so as to obtain required security codes and keys to access the API and could modify or build their own device driver. A different party or parties could provide the rules engine 1011 in other embodiments. For example, the developer of peripheral 1019 could host the rules engine 1011.

For the avoidance of doubt, references to "Mastercard," "an entity such as Mastercard International Incorporated," and the like, unless expressly stated to be limited to Mastercard, are intended to be exemplary of an operator of a payment card network, as will be appreciated by the skilled artisan from the context, whether or not qualified by words such as "or other operator"; in some embodiments, such an entity may also host the rules engine 1011, 1111.

It should be reiterated that in one or more embodiments, steps are taken before an ISO 8583 0100 auth request (or analogous auth request) is ever sent into BANKNET (or another payment card network).

One or more embodiments are not limited to commerce. For example, some embodiments pertain to access to a members-only area on a web site or in a game (via a button analogous to 1015 or the like).

In one or more embodiments, the rules engine 1011 is programmed to know where the button (such as 1015) is and what actions are to be taken when the user navigates in the proximity of the button 1015 or the like. In one or more embodiments, peripheral profiles are stored in engine 1011. In this regard, a given peripheral may have certain rules associated with it that should be recognized by the rules engine. Different peripherals will typically require different types of feedback. For example, the rules engine may give a general instruction "move hand down and to the right" and then the peripheral profile will have the information about how to implement that type of motion on the peripheral in question. In some embodiments the profiles are also customized based on user preferences; e.g., how strong to vibrate. This typically requires an identification login to determine who the user is so that the customization can be applied, or alternatively, the customization could be at the level of the local SDK device driver (i.e. configurable via a dashboard as opposed to re-coding; intensity/duration of vibration).

In one or more embodiments, there are profiles associated just with the peripheral—the peripheral works in this way, can provide this kind of stimulus and needs this kind of command. There is the option of further personalizing to the user; e.g., if accessing a dangerous website, want a continuous uncomfortable vibration; if being guided around a safe web site, want two-second gentle vibration. Indeed, some embodiments have three levels of customization: (1) turn rules on/off, e.g., only want notice of fact at a dangerous web site, turn other warnings off; (2) preferences around how rules are interpreted e.g. intensity and duration of vibration; (3) comfort preferences—normal vibration to indicate direction but no vibration should last longer than two seconds.

In one or more embodiments, the site map that the merchant (optionally) provides to the rules engine in step 1001 may include, for example, the html for the web page of merchant site 1013. The rules engine then interprets the html and turns it into appropriate code or the like that maps to the site haptics.

The haptic-enabled peripheral 1019 has two roles in one or more embodiments: (i) providing direction/guidance to the visually impaired and/or (ii) warning a user regarding click bait/phishing/unsafe sites and the like. This latter aspect may involve more subjectivity in determining when to issue a warning.

For an augmented reality (AR) environment, or for moving a pointer around a screen on a desktop, the user uses his or her hand and/or finger(s). Once the rules engine builds the map of where the button such as 1015 is on the page, it can interpret that map to determine when the user has moved over that particular button. This approach makes it easy for merchants to adopt the system, as opposed to requiring building a template or employing pseudo code to indicate where the button is. The rules engine 1011 can interpret the html and determine where the button is. In some embodiments, the entity that develops the web page is advised to tag the button in a certain way in the html. The rules engine then works out the button's position from the html. Once it is known where the button is located, the html can be turned into a map that makes sense for the site haptics. In this scenario, the merchant cooperates with the entity providing the rules engine 1011 to help develop a good rules engine.

Figure 11:
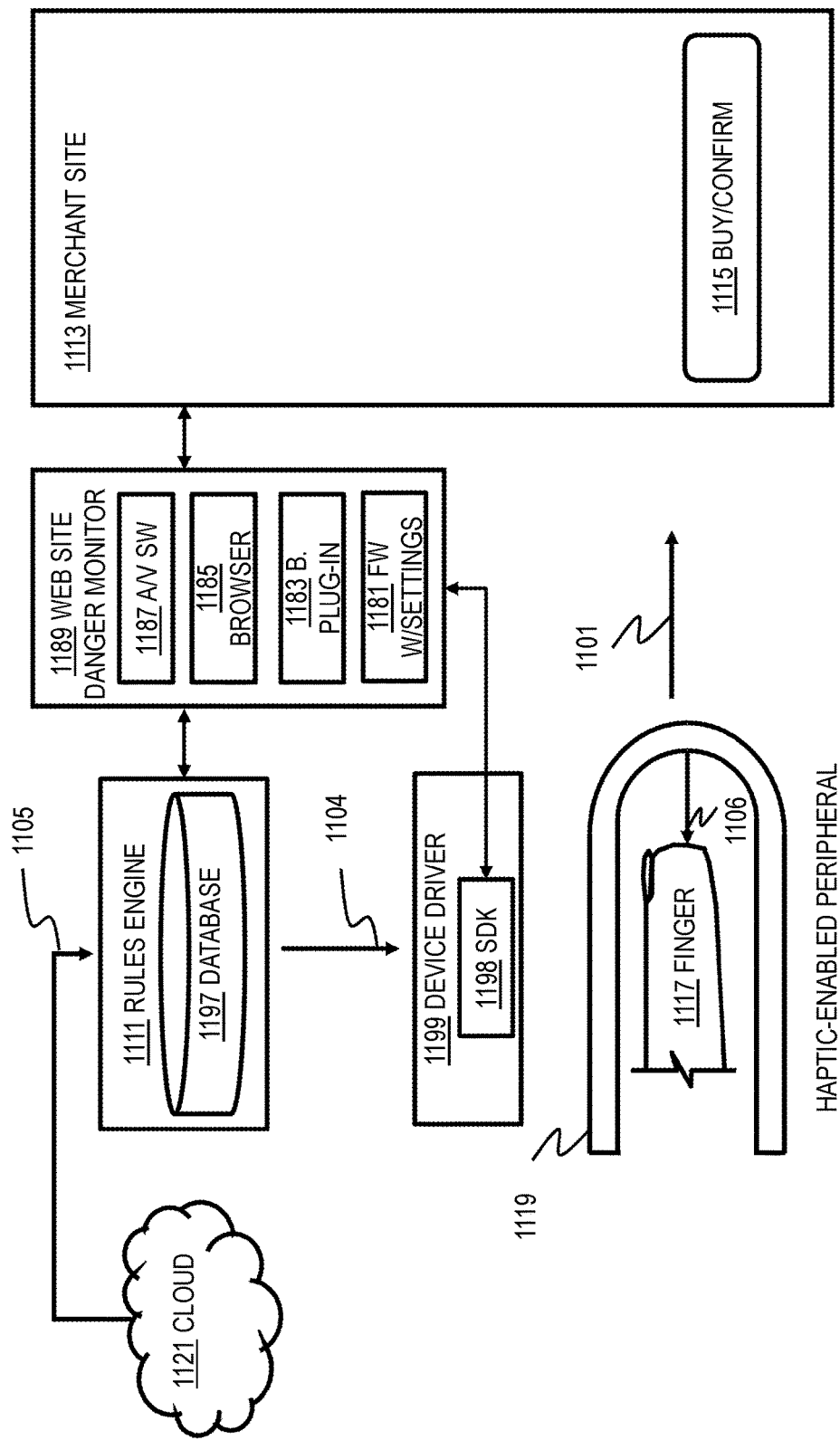
FIG. 11 is a combined block diagram and data flow diagram depicting a second embodiment of a system and method, according to an aspect of the invention.

Referring now to FIG. 11, in another aspect, the merchant site 1113 does not communicate/cooperate with the rules engine 1111; i.e., does not provide engine 1111 with a site map. This embodiment can be used, for example, to protect against a fraudulent, compromised, virus-infested, untrusted, and/or otherwise unsafe site. In step 1101, the user browses to the site 1113 using a browser program interacting with peripheral 1119. Appropriate details (e.g., site, merchant, category, product(s) in basket) are transmitted to the rules engine 1111. In step 1104, the engine 1111 responds to the peripheral with appropriate instructions to cause feedback based on the received details; e.g., BAD/AVOID or GOOD/GO. As indicated at step 1105, the decision may be based on additional data, (e.g., budget) such as from cloud 1121.

The skilled artisan will appreciate that other entities watching a user's browser traffic typically warn that a site is not safe, rather than the site itself—e.g., anti-virus software 1187, web browsers themselves 1185, web browser plug-ins 1183, firewalls with appropriate settings 1181, and the like carry out web site danger monitoring at 1189. In one or more embodiments, these entities are integrated into the local device SDK 1198. Instead of or in addition to popping up a message on the screen to indicate that the site is not safe, they will make a call to the local device. They will discover that the device driver is present, make the call into an appropriate API that says "warn user," and this causes the appropriate warning to the user. In one or more embodiments, there is a direct integration with the entity providing the warning: the browser itself, a browser plug-in, anti-virus software, or firewall. These entities typically contain rules for warning about certain sites. An entity such as Mastercard International Incorporated (or other entity) could offer a plug-in for the device driver of the glove or other haptic peripheral, to allow any of these third parties to provide the physical feedback or warning in this manner. Thus, in the first embodiment of FIG. 10, the merchant is cooperative (by providing a site map ab initio and/or tagging the html for the site so the rules engine can generate the map) while in FIG. 11 the merchant or other web site operator is not cooperative/compliant and the warning is provided by a third party. In some embodiments, a site is added to the warning list by a provider of anti-virus software or similar third party. Thus, in one or more embodiments, anti-virus software 1187, web browsers themselves 1185, web browser plug-ins 1183, and/or firewalls with appropriate settings 1181, and the like, carrying out web site danger monitoring 1189, initiate the rules to send the warnings to the user. Note that in the embodiment(s) of FIG. 11, buy/confirm button 1115 may or may not be present because this aspect relates less to a particular action on the page and more to the entire web site being dangerous per a third party component.

In step 1106, the peripheral 1119 provides appropriate haptic feedback to finger 1117 of the user. For example, the haptic feedback may create a significant buzzing sensation or the like if the user navigates to a site that is deemed unsafe. This warns the user not to activate buy/confirm button 1115 and/or to navigate away from the site and possibly even initiate a virus and/or malware scan. For example, the haptic peripheral may direct the user to locate the mouse pointer at the icon for a virus scan application.

In the embodiment just discussed with respect to FIG. 11, the merchant has not set up any rules with engine 1111 and an entity such as an anti-virus provider or the like warns the user by providing feedback, using peripheral 1119, regarding the site to which the user has navigated.

In FIG. 11, elements 1197, 1199 are analogous to elements 1097, 1099 in FIG. 10.

In some instances, the embodiment of FIG. 10 may be commerce-focused, while that of FIG. 11 may be appropriate for any kind of web site. The engine 1111 could be implemented, for example, by an entity that monitors web sites, such as a browser provider; via anti-virus software; via a plug-in that a user downloads to his or her browser (like a popup blocker) to warn the user that the site might be unsafe; or the like.

Thus, some aspects of the embodiment of FIG. 10 are directed to guiding the consumer around a web site. For example, a visually impaired individual is assisted in navigating a web site, and even someone who is not visually impaired will be able to navigate the 1013 site more efficiently. In some embodiments, peripheral 1019 creates the feeling of a hard surface that the user is pressing against, with certain places he or she can get through and certain places he or she cannot get through. Thus, in essence, one or more embodiments create a virtual physical funnel to direct the consumer to, and/or away from, one or more areas of a site.

Thus, one or more embodiments illustrated in connection with FIG. 11 can provide guidance such as "yes you should buy/no, you should not buy" or provide feedback on the entire site, i.e., whether it is safe. One or more such embodiments may be particularly helpful for the visually impaired but are also useful for those with unimpeded vision. Thus, aspects of the embodiment depicted in FIG. 11, where the merchant site or other site does not voluntarily provide a map to the rules engine 1111, can be used to provide guidance to an individual to confirm that a purchase is advisable or inadvisable, or even prior to the putative transaction proceeding that far, providing feedback about the entire site, such as whether the site itself is safe or the user should navigate away immediately without further browsing. This aspect is also appropriate for both the visually impaired and those with unimpeded vision. The aspect of warning a user away from a potentially dangerous web site is applicable to both merchant/commerce sites and other kinds of sites. For example, the peripheral 1119 may guide the user to move the pointing device to the familiar upper right-hand corner "X" to close the browser window displaying the dangerous web site and may subsequently guide the user to engage in a remediation action, a non-limiting example of which is to open an anti-virus or malware detection program and initiate a scan—the user may be prompted to move the pointing device to open a virus scan and/or malware detection program.

In any of the embodiments, a number of techniques can be utilized to implement the rules engine 1011, 1111. Some embodiments simply employ IF-THEN-ELSE statements rendered in a high-level language and compiled or interpreted as appropriate. Other embodiments can employ, for example, pattern matching. With regard to pattern matching, in one aspect use a scraper or crawler program or the like to scrape publicly available web sites, have human experts annotate them manually to create a training corpus, and allow the rules engine to learn from the training corpus. In this aspect, aggregate a wide range of sites so that when a new site comes along, zones can be laid out without human interaction. In some cases, this logic could be built into a browser so that as it come across new sites it has not seen before, and that do not exist in any kind of available database, the rules engine can apply a best-case for how to navigate that site.

Figure 14:
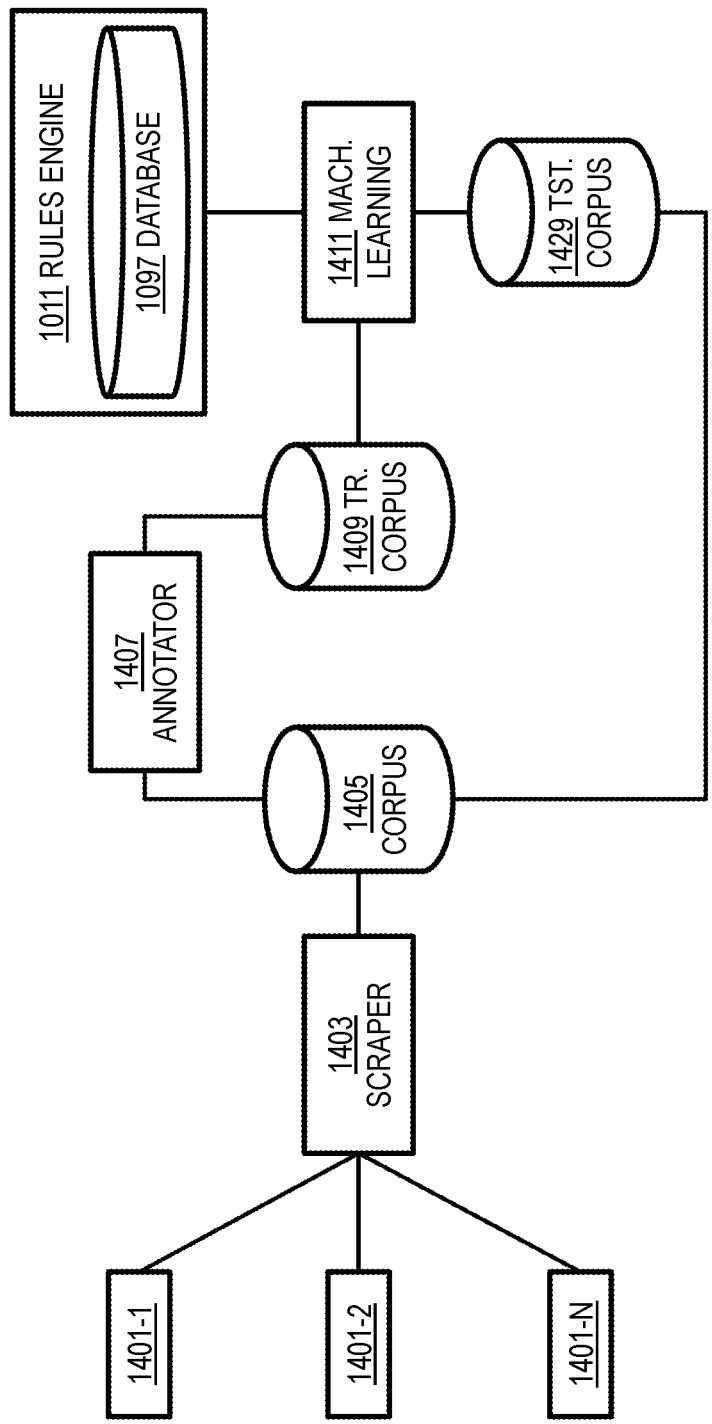
FIG. 14 shows an exemplary machine learning process, according to an aspect of the invention.

Referring now to FIG. 14, some embodiments employ machine learning including training and test corpuses and a scraper as part of an offline training process. The scraping process typically happens earlier before the user interacts with the site. Scraper 1403 rips through hundreds, thousands, or more merchant web sites 1401-1, 1401-2, 1401-N and works out where the buttons are or else the scraper creates a corpus 1405. A human expert 1407 labels a portion of the web sites in corpus 1405 as to where the buttons are to create training corpus 1409 and this is fed into a machine learning process 1411 to create rules for the rules engine 1011. A portion of the corpus 1405 can be withheld to use as a test corpus 1429 to determine how well the machine learning process 1411 is functioning. In one or more embodiments, the process just described does not impact the user's experience or training. It is analogous to training a speech recognition engine for general users and when individuals use it they are interacting with something that is already trained. Once the training is completed, if the user navigates to an unknown merchant site, the rules engine is now smart enough, having seen the patterns before, to be able to find the checkout button rather than merely returning a "page not recognized." Rules engines 1011, 1111 can include rules developed from training as shown in FIG. 14.

In some instances, the structure of the web page corresponding to the merchant site can be visually represented as a number of layers; in essence, akin to something solid with holes in it. Stated in another way, the structure of the web page corresponding to the merchant site can be treated as a fine matrix with zones of action; the actions may include, for example, vibration or squeezing. Vibration can be of a certain pattern such as Morse code. Action zones with actions to take/events are then associated with the matrix.

Some embodiments employ both IF-THEN rules and also a graphical mechanism that allows someone interacting with the engine to "paint" certain areas of the page as good or bad. The merchant site can be coded up and where the buy/confirm button 1015 is located, the appropriate ID, action is embedded (for example, vibrate in a pattern dot-dot-dash-dash). The rules engine 1011 interprets this and there is thus a mapping for an action to be taken. The merchant and/or others cooperating on the process will have in mind particular feedback that means "good" or "bad." Furthermore in this regard, in one or more embodiments, the rules engine requires a digital representation of the page, or at least zones such as buy button, back button, check terms and conditions button—the developer can embed tags in html or can build a tool to allow someone who is not a developer to drags boxes around the screen to mark the desired locations. Some embodiments provide a WYSIWYG (what you see is what you get) to allow a non-developer to mark up a page. One or more embodiments provide a merchant or the entity that manages the merchant's web site with a tool to make the web site interact with the rules engine.

In another aspect, the rules engine 1011, 1111 learns what is "good" and "bad" over time and makes suggestions. This can involve scraping pages and/or carrying out image recognition. For example, the merchant may have a site already built and may not want to go back into the html and make changes. In this aspect, "rip" through the site with a "scraper," identify buttons such as 1015, 1115 by trial and error, and then build events and action zones, effectively reverse engineering a web site to make it accessible to the visually impaired. In some embodiments, a template specifies where to locate desired actions; e.g., where to locate the buy/confirm button 1015, 1115, and the like.

Thus, some aspects incentivize a purchase transaction or guide a person to a certain spot on a web page, while other aspects restrict a purchase transaction or guide a person away from a certain spot on a web page. For the avoidance of doubt, embodiments are not intended to nefariously force people to buy or perform other actions against their will, but rather, for example, to prevent excessive or inappropriate purchases, prevent access to a dangerous web site, or to guide a minor child or the like to buy a healthy snack not candy. Another non-limiting example is to assist someone in reaching an appropriate location—for example, suppose someone is online trying to find a part for his or her refrigerator—there are many different parts—some embodiments could help the individual find the right part. Some embodiments advantageously prevent someone from being compelled or defrauded into purchasing something they should not or taking some other action they should not—some embodiments are not limited to impacting a "purchase/do not purchase" decision.

Thus, haptic feedback in a digital commerce setting can be used to incentivize/dis-incentivize and/or restrict a purchase. One or more embodiments provide a system to deliver haptic feedback through a consumer device to change consumer behavior around commerce. Using haptic feedback, it is possible to create experiences for consumers that either near or at the time the consumer decides to purchase can change behavior. In one or more embodiments, action is taken before the user actually initiates the purchase and before any authorization request into a payment card network is allowed to occur. This can be useful in helping a consumer adhere to a budget; avoid fraudulent goods or merchants; and the like. It can also create a "reward" in the sense that physical feedback after a purchase can provide the consumer with a greater sense of satisfaction. Some embodiments of the system can also help consumers navigate through an experience to improve accessibility for the visually impaired or in other circumstances (e.g., the rules engine may cooperate with the other pertinent components to indicate to the user "let me guide you"). Some embodiments of the system can also be reversed to protect consumers by identifying inappropriate implementations of haptic feedback that are intended to nefariously trigger or compel a purchase, and flagging these purchases for enhanced scrutiny by participants in the payments processing value chain.

One or more embodiments advantageously improve conversion on an e-commerce site (or other digital point of interaction (POI)) and/or digital (VR) environment. One or more embodiments enhance the consumer's purchase experience and/or reduce the incidence of fraud.

Recapitulation

Given the discussion thus far, it will be appreciated that, in general terms, an exemplary method includes the step 1001 of obtaining, at a rules engine 1011, a web site map of an external web site. The web site map includes information permitting determination of at least one pertinent location on the web site (e.g., button 1015). In one or more embodiments, the rules engine contains a representation of the external site. A further step includes obtaining, at the rules engine 1011, at least one rule specifying peripheral behavior in a region adjacent the at least one pertinent location on the web site (e.g., near or over the button 1015). An even further step 1003 includes obtaining, at the rules engine 1011, an indication that a peripheral device (e.g. 1019) corresponding to the at least one rule is being used to browse the web site 1013. A still further step 1004 includes dispatching, from the rules engine 1011 to the peripheral device 1019, instructions corresponding to the at least one rule specifying the peripheral behavior in the region adjacent the at least one pertinent location on the web site. The instructions are configured to cause a stimulus to a user (e.g. user's finger 1017) of the peripheral device prior to the user attempting to consummate an action on the web site.

The instructions could include signals to cause actuators in the peripheral to provide the stimulus, or could include rules form the rules engine in a form to be locally evaluated and applied by the peripheral and its driver.

In one or more embodiments, the peripheral device includes a haptic-enabled peripheral device 1019, and the instructions dispatched in the dispatching step are configured to cause a haptic stimulus to the user.

In some instances, in the step 1001 of obtaining the web site map, the web site is a merchant web site 1013, and the at least one pertinent location on the web site is a buy/confirm button 1015. In the dispatching step, the action is a purchase transaction.

The step of obtaining the rules can include, for example, obtaining the rules from at least one of the merchant, the user, and a bank of the user.

In some cases, the haptic-enabled peripheral device is a glove, and the at least one rule dispatched in the dispatching step is configured to cause a haptic stimulus to the user via the glove.

In some cases, the haptic glove (e.g., 1019, 1201) is formed with an open region (e.g. opening in fingertip) and/or a conductive micro-fiber region permitting use of a touch screen while wearing the glove; and the haptic-enabled peripheral device includes the haptic glove working together with a touch screen (e.g. 810, 540) via the open region and/or conductive micro-fiber region. In the step of obtaining the indication that the peripheral device corresponding to the at least one rule is being used to browse the web site, the touch screen is used for the browsing, while in the step of dispatching the instructions configured to cause the stimulus to the user, the stimulus is applied via the haptic glove.

In some embodiments, the rules engine, the SDK, and the provided APIs are embedded in a piece of hardware such as a touch screen or other monitor, but the haptic feedback is still provided by a glove.

In one or more embodiments, the at least one rule does not specify any particular behavior for the peripheral device 1019 away from the region adjacent the at least one pertinent location 1015, but does specify particular behavior for the peripheral device in the region adjacent the at least one pertinent location under appropriate circumstances. The appropriate circumstances could include any entry of the peripheral device into the region adjacent the at least one pertinent location; in an alternative approach, obtain additional data at the rules engine 1011 (e.g., from cloud 1021 as shown at 1003A), in which case the appropriate circumstances include both entry of the peripheral device into the region adjacent the at least one pertinent location and satisfaction of a condition specified in or derived from the additional data. In a non-limiting example, this additional data could include, for example, the consumer's bank indicating that the consumer should not purchase anything over $1000 because the consumer's monthly budget would be exceeded. The stimulus is then only provided if the peripheral is proximate the button 1015 AND the monthly budget is also going to be exceeded by the purchase.

In one or more embodiments, in the dispatching step, the instructions are configured to cause the stimulus to repel the user from the at least one pertinent location on the merchant web site.

Alternatively, under different appropriate circumstances, the system can provide a stimulus to guide the consumer to push the button. The user guidance is illustrated by arrow 1005. Guidance may be appropriate, for example, for the visually impaired, for minor children, and the like. In the latter case, a child could be encouraged to buy a healthy snack or read a book rather than buying candy or playing a video game. Thus, in some instances, in the dispatching step 1004, the instructions are configured to cause the stimulus to attract the user to the at least one pertinent location 1015 on the merchant web site 1013.

In one or more embodiments, in the step of obtaining the web site map, the information permitting determination of the at least one pertinent location on the web site includes a predefined tag embedded in hypertext markup language of the web site. On the other hand, in other embodiments, in the step of obtaining the web site map, the information permitting determination of the at least one pertinent location on the web site includes ordinary hypertext markup language of the web site (i.e., requiring no special action by the site developer), and a further step includes determining the at least one pertinent location on the web site from the ordinary hypertext markup language. As discussed above, this could be carried out, for example, by engine 1011, optionally using a machine learning process or the like.

Some embodiments further include obtaining a training corpus of human-annotated code of scraped publicly available web sites, and carrying out machine learning on the training corpus to develop rules for the rules engine 1011. In this aspect, the determining of the at least one pertinent location on the web site from the ordinary hypertext markup language includes applying results of the machine learning, as just discussed. Refer to FIG. 14.

As noted, other types of stimulus are possible; for example, the instructions 1004 dispatched in the dispatching step can be configured to cause at least one of a characteristic tone and a vibration on a mobile device of the user (e.g. ring tone on smart phone 800).

In a non-limiting example, the rules engine is hosted by an operator of a payment card network such as 2008, and the stimulus to the user of the peripheral device is caused prior to a payment card authorization request associated with the action being allowed to be initiated to the operator. For example, network operator 2008 only receives the ISO 8583 0100 auth request after the user receives (haptic) stimulus guiding the user to the button, or alternatively, never receives an ISO 8583 0100 auth request or the like for the putative transaction where the user is guided away from the button.

Furthermore, given the discussion thus far, it will be appreciated that, in general terms, another exemplary method includes the step of obtaining, at a rules engine 1111, at least one rule specifying peripheral behavior when browsing a web site (e.g., a merchant site 1113 or another site not necessarily of a merchant) for which a site map is not available to the rules engine. A further step includes obtaining, at the rules engine, an indication that a peripheral device (e.g. 1119) corresponding to the at least one rule is being used to browse the web site—for example, the peripheral communicates with the browser which locally renders the site, and the browser communicates with the engine 1111. An even further step 1104 includes dispatching, from the rules engine to the peripheral device, instructions corresponding to the at least one rule specifying the peripheral behavior when browsing the web site. The instructions are configured to cause a stimulus to a user (e.g., finger 1117 thereof) of the peripheral device prior to the user attempting to consummate an action on the web site.

In one or more embodiments, the peripheral device includes a haptic-enabled peripheral device 1119, and the instructions dispatched in the dispatching step 1104 are configured to cause a haptic stimulus to the user.

In some instances, the haptic-enabled peripheral device includes a touch screen (e.g. 810, 540) and a haptic glove (e.g., 1019, 1201) is formed with at least one of an open region (e.g. opening in fingertip) and a conductive micro-fiber region permitting use of the touch screen while wearing the glove. The haptic glove works together with the touch screen via the open region and/or the conductive micro-fiber region. In the step of obtaining the indication that the peripheral device corresponding to the at least one rule is being used to browse the web site, the touch screen is used for the browsing; in the step of dispatching the instructions configured to cause the stimulus to the user, the stimulus is applied via the haptic glove.

In some cases, in the dispatching step, the instructions are configured to cause the stimulus to repel the user from further navigation of the web site (e.g., without further navigations thereon). The aspect of warning a user away from a potentially dangerous web site is applicable to both merchant/commerce sites and other kinds of sites.

In some cases, in the dispatching step, the instructions are further configured to cause the stimulus to encourage the user to initiate at least one of a virus scan and a malware scan. For example, the peripheral 1119 guides the user to the icon for the corresponding scan app.

The rules engine 1111 can be provided, for example, as a service, by an entity such as an anti-virus software provider, an anti-malware software provider, a browser plug-in provider, and/or a browser provider. For example, engine 1111 could be implemented by an entity that monitors web sites, such as a browser provider; via anti-virus software; via a plug-in that a user downloads to his or her browser (similar to a popup blocker) to warn the user that the site might be unsafe; or the like.

The web site can be a merchant web site, and the obtaining 1103 of the indication that the peripheral device is being used to browse the web site can include obtaining, for example, shopping basket contents, and an identity and/or a merchant category of the merchant (for example, to limit a child's access to certain web sites—could be based on specific sites or a category). The instructions can be configured to cause the stimulus to the user prior to the user attempting to consummate a purchase on the web site, the stimulus can indicate to the user one of a BUY and a DO NOT BUY recommendation.

Also contemplated are systems and/or apparatuses as disclosed herein. For example, an apparatus could include a rules engine including a memory 812 or 530 (discussed below); and at least one processor 802 or 520 (discussed below), coupled to the memory, and operative to carry out any one, some, or all of the method steps described herein. In some instances, the apparatus also includes a haptic-enabled peripheral device (e.g., 1019, 1201) coupled to the rules engine; for example, via the device driver 1099 as described. In some cases, the haptic-enabled peripheral device in turn includes a touch screen; and a haptic glove as described above. The touch screen may have an appropriate screen driver or the like to integrate with the rules engine and glove.

System and Article of Manufacture Details

Embodiments of the invention can employ hardware and/or hardware and software aspects. Software includes but is not limited to firmware, resident software, microcode, etc.

Software might be employed, for example, in connection with one or more modules to implement at least a portion of one or more of the elements of the systems and/or flows of FIGS. 10-14; a terminal 122, 124, 125, 126; a reader 132; a host, server, and/or processing center 140, 142, 144 (optionally with data warehouse 154) of a merchant, issuer, acquirer, processor, other third party, or operator of a network 2008 and/or rules engine 1011, 1111; and the like. Firmware might be employed, for example, in connection with payment devices such as cards 102, 112, as well as reader 132.

Figure 3:
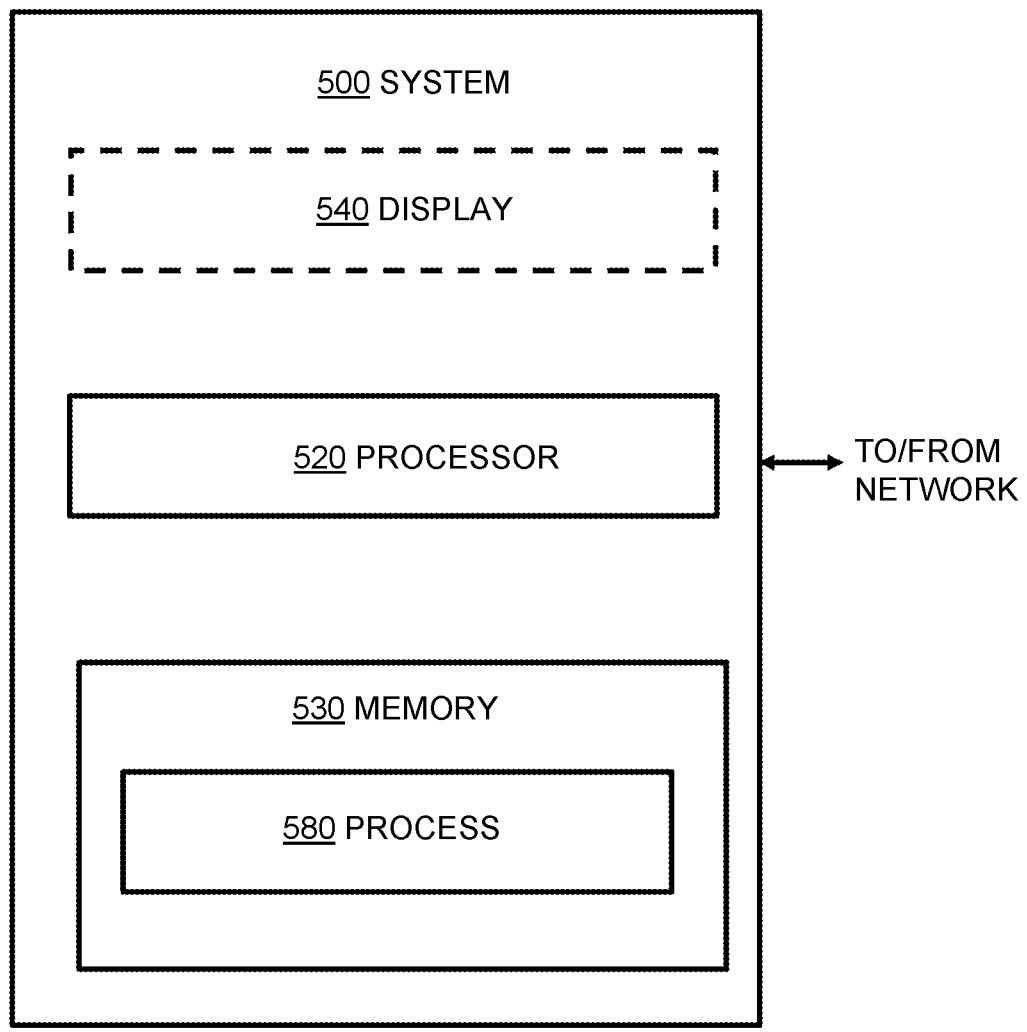
FIG. 3 is a block diagram of an exemplary computer system useful in one or more embodiments of the invention.

FIG. 3 is a block diagram of a system 500 that can implement part or all of one or more aspects or processes of the invention. As shown in FIG. 3, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008 and/or systems and/or flows of FIGS. 10-14, rules engine 1011, 1111; and the like); to implement one or more aspects of the methods, steps, and functions disclosed herein (collectively, shown as process 580 in FIG. 3). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008 and/or rules engine 1011, 1111, and/or systems and/or flows of FIGS. 10-14; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing aspects of network 2008 and/or rules engine 1011, 1111, and/or systems and/or flows of FIGS. 10-14; hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 3) running a server program. It will be understood that such a physical server may or may not include a display, keyboard, or other input/output components. A "host" includes a physical data processing system (for example, system 500 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008, rules engine 1011, 1111 and/or systems and/or flows of FIGS. 10-14. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    obtaining, at a rules engine, a web site map of a web site, said web site map including information permitting determination of at least one pertinent location on said web site;
    obtaining, at said rules engine, at least one rule specifying peripheral behavior in a region adjacent said at least one pertinent location on said web site, wherein said at least one rule does not specify any particular behavior for a peripheral device away from said region adjacent said at least one pertinent location, and specifies particular behavior for said peripheral device in said region adjacent said at least one pertinent location under appropriate circumstances;
    obtaining, at said rules engine, an indication that said peripheral device corresponding to said at least one rule is being used to browse said web site;
    obtaining additional data at said rules engine, wherein said appropriate circumstances comprise both entry of said peripheral device into said region adjacent said at least one pertinent location and satisfaction of a condition specified in or derived from said additional data, said satisfaction of said condition being independent of said at least one pertinent location and a location of said peripheral device in relation to said at least one pertinent location; and
    dispatching, from said rules engine to said peripheral device, instructions corresponding to said at least one rule specifying said peripheral behavior in said region adjacent said at least one pertinent location on said web site, said instructions being configured to cause a stimulus to a user of said peripheral device prior to said user attempting to consummate an action on said web site.

2. The method of claim 1, wherein said peripheral device comprises a haptic-enabled peripheral device, and wherein said instructions dispatched in said dispatching step are configured to cause a haptic stimulus to said user.

3. The method of claim 2, wherein:
    in said step of obtaining said web site map, said web site comprises a merchant web site, and said at least one pertinent location on said web site comprises a buy/confirm button; and
    in said dispatching step, said action comprises a purchase transaction.

4. The method of claim 3, wherein said step of obtaining said rules comprises obtaining said rules from at least one of a merchant, said user, and a bank of said user.

5. The method of claim 2, wherein said haptic-enabled peripheral device comprises a glove, and wherein said at least one rule dispatched in said dispatching step is configured to cause a haptic stimulus to said user via said glove.

6. The method of claim 5, wherein:
    said haptic glove is formed with at least one of an open region and a conductive micro-fiber region permitting use of a touch screen while wearing said glove;
    said haptic-enabled peripheral device comprises said haptic glove working together with said touch screen via said at least one of an open region and a conductive micro-fiber region;
    in said step of obtaining said indication that said peripheral device corresponding to said at least one rule is being used to browse said web site, said touch screen is used for said browsing; and
    in said step of dispatching said instructions configured to cause said stimulus to said user, said stimulus is applied via said haptic glove.

7. The method of claim 1, wherein said appropriate circumstances comprise any entry of said peripheral device into said region adjacent said at least one pertinent location.

8. The method of claim 1, wherein, in said dispatching step, said instructions are configured to cause said stimulus to attract said user to said at least one pertinent location on a merchant web site.

9. The method of claim 1, wherein, in said dispatching step, said instructions are configured to cause said stimulus to repel said user from said at least one pertinent location on a merchant web site.

10. The method of claim 1, wherein, in said step of obtaining said web site map, said information permitting determination of said at least one pertinent location on said web site comprises a predefined tag embedded in hypertext markup language of said web site.

11. The method of claim 1, wherein, in said step of obtaining said web site map, said information permitting determination of said at least one pertinent location on said web site comprises ordinary hypertext markup language of said web site, further comprising determining said at least one pertinent location on said web site from said ordinary hypertext markup language.

12. The method of claim 11, further comprising:
obtaining a training corpus of human-annotated code of scraped publicly available web sites; and
carrying out machine learning on said training corpus to develop rules for said rules engine;
wherein said determining of said at least one pertinent location on said web site from said ordinary hypertext markup language comprises applying results of said machine learning.

13. The method of claim 1, wherein said instructions dispatched in said dispatching step are configured to cause at least one of a characteristic tone and a vibration on a mobile device of said user.

14. The method of claim 1, wherein said rules engine is hosted by an operator of a payment card network, and wherein said stimulus to said user of said peripheral device is caused prior to a payment card authorization request associated with said action being allowed to be initiated to said operator.

15. A method comprising:
obtaining, at a rules engine, at least one rule specifying peripheral behavior when browsing a web site for which a site map is not available to said rules engine;
obtaining, at said rules engine, an indication that a peripheral device corresponding to said at least one rule is being used to browse said web site;
obtaining additional data at said rules engine, said additional data specifying or indicating a condition, a satisfaction of said condition being independent of said at least one pertinent location and a location of said peripheral device in relation to at least one pertinent location; and
dispatching, from said rules engine to said peripheral device, instructions corresponding to said at least one rule specifying said peripheral behavior when browsing said web site and said condition is satisfied, said instructions being configured to cause a stimulus to a user of said peripheral device prior to said user attempting to consummate an action on said web site.

16. The method of claim 15, wherein said peripheral device comprises a haptic-enabled peripheral device, and wherein said instructions dispatched in said dispatching step are configured to cause a haptic stimulus to said user.

17. The method of claim 16, wherein:
said haptic-enabled peripheral device comprises:
a touch screen; and
a haptic glove formed with at least one of an open region and a conductive micro-fiber region permitting use of said touch screen while wearing said glove, said haptic glove working together with said touch screen via said at least one of an open region and a conductive micro-fiber region;
in said step of obtaining said indication that said peripheral device corresponding to said at least one rule is being used to browse said web site, said touch screen is used for said browsing; and
in said step of dispatching said instructions configured to cause said stimulus to said user, said stimulus is applied via said haptic glove.

18. The method of claim 16, wherein, in said dispatching step, said instructions are configured to cause said stimulus to repel said user from further navigation of said web site.

19. The method of claim 18, wherein, in said dispatching step, said instructions are further configured to cause said stimulus to encourage said user to initiate at least one of a virus scan and a malware scan.

20. The method of claim 16, further comprising an entity providing said rules engine as a service, said entity comprising at least one of an anti-virus software provider, an anti-malware software provider, a browser plug-in provider, and a browser provider.

21. The method of claim 16, wherein:
said web site comprises a merchant web site;
said obtaining of said indication that said peripheral device is being used to browse said web site comprises obtaining:
at least one of an identity and a merchant category of a merchant; and
a shopping basket contents;
said instructions are to cause said stimulus to said user prior to said user attempting to consummate a purchase on said web site, said stimulus indicating to said user one of a BUY and a DO NOT BUY recommendation.

22. An apparatus comprising:
a rules engine, said rules engine in turn comprising;
a memory; and
at least one processor, coupled to said memory, and operative to:
obtain a web site map of an web site, said web site map including information permitting determination of at least one pertinent location on said web site;
obtain at least one rule specifying peripheral behavior in a region adjacent said at least one pertinent location on said web site, wherein said at least one rule does not specify any particular behavior for a peripheral device away from said region adjacent said at least one pertinent location, and specifies particular behavior for said peripheral device in said region adjacent said at least one pertinent location under appropriate circumstances;
obtain an indication that said peripheral device corresponding to said at least one rule is being used to browse said web site;
obtain additional data at said rules engine, wherein said appropriate circumstances comprise both entry of said peripheral device into said region adjacent said at least one pertinent location and satisfaction of a condition specified in or derived from said additional data, said satisfaction of said condition being independent of said at least one pertinent location and a location of said peripheral device in relation to said at least one pertinent location; and
dispatch to said peripheral device, instructions corresponding to said at least one rule specifying said peripheral behavior in said region adjacent said at least one pertinent location on said web site, said instructions being configured to cause a stimulus to a user of said peripheral device prior to said user attempting to consummate an action on said web site.

23. The apparatus of claim 22, further comprising a haptic-enabled peripheral device coupled to said rules engine; said haptic-enabled peripheral device in turn comprising:
a touch screen; and
a haptic glove formed with at least one of an open region and conductive micro-fiber region permitting use of said touch screen while wearing said glove, said haptic glove working together with said touch screen via said at least one of an open region and a conductive micro-fiber region;

wherein:

when said at least one processor obtains said indication that said peripheral device corresponding to said at least one rule is being used to browse said web site, said touch screen is used for said browsing; and when said at least one processor dispatches said instructions configured to cause said stimulus to said user, said stimulus is applied via said haptic glove.

24. An apparatus comprising:

a rules engine, said rules engine in turn comprising;
   a memory; and
   at least one processor, coupled to said memory, and operative to:
      obtain at least one rule specifying peripheral behavior when browsing a web site for which a site map is not available to said rules engine;
      obtain an indication that a peripheral device corresponding to said at least one rule is being used to browse said web site;
      obtain additional data at said rules engine, said additional data specifying or indicating a condition, a satisfaction of said condition being independent of said at least one pertinent location and a location of said peripheral device in relation to at least one pertinent location; and
      dispatch, to said peripheral device, instructions corresponding to said at least one rule specifying said peripheral behavior when browsing said web site and said condition is satisfied, said instructions being configured to cause a stimulus to a user of said peripheral device prior to said user attempting to consummate an action on said web site.

25. The apparatus of claim 24, further comprising a haptic-enabled peripheral device coupled to said rules engine; said haptic-enabled peripheral device in turn comprising:

a touch screen; and a haptic glove formed with at least one of an open region and a conductive micro-fiber region permitting use of said touch screen while wearing said glove, said haptic glove working together with said touch screen via said at least one of an open region and a conductive micro-fiber region;

wherein:

when said at least one processor obtains said indication that said peripheral device corresponding to said at least one rule is being used to browse said web site, said touch screen is used for said browsing; and when said at least one processor dispatches said instructions configured to cause said stimulus to said user, said stimulus is applied via said haptic glove.

* * * * *